(12) United States Patent
Aoki et al.

(10) Patent No.: US 7,086,687 B2
(45) Date of Patent: Aug. 8, 2006

(54) POWER SUPPLY DEVICE FOR A SLIDING DOOR

(75) Inventors: Takanori Aoki, Tokyo (JP); Hirokazu Kanbayashi, Tokyo (JP); Toshihiro Kawazoe, Tokyo (JP); Kazuyuki Kusano, Tokyo (JP); Hironori Yanagimoto, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/123,043

(22) Filed: May 6, 2005

(65) Prior Publication Data
US 2005/0264033 A1    Dec. 1, 2005

(30) Foreign Application Priority Data
May 31, 2001 (JP) ............................. 2004-160403
Dec. 6, 2004 (JP) ............................. 2004-352285

(51) Int. Cl.
*B60J 5/06* (2006.01)

(52) U.S. Cl. ................... 296/155; 174/72 A; 191/23 R

(58) Field of Classification Search ............ 296/146.1, 296/155, 146.9; 174/72 A, 135; 191/23 R; 439/34, 162
See application file for complete search history.

(56) References Cited

U.S. PATENT DOCUMENTS

| 6,076,883 A * | 6/2000 | Labonde et al. ............ 296/155 |
| 6,321,489 B1 * | 11/2001 | Murofushi et al. ............ 49/360 |
| 6,515,229 B1 * | 2/2003 | Aoki et al. ................... 296/155 |
| 6,682,353 B1 * | 1/2004 | Bigotto ....................... 296/155 |
| 6,793,259 B1 * | 9/2004 | Sano et al. .................. 296/155 |
| 6,818,827 B1 * | 11/2004 | Kato et al. ................... 296/155 |
| 6,881,902 B1 * | 4/2005 | Aoki et al. ................... 296/155 |
| 6,919,511 B1 * | 7/2005 | Tsunoda et al. ............. 296/155 |
| 2003/0164625 A1 * | 9/2003 | Dobson ....................... 296/155 |

FOREIGN PATENT DOCUMENTS

| JP | 11-93514 | 4/1999 |
| JP | 2002-79892 | 3/2002 |

* cited by examiner

*Primary Examiner*—Jason Morrow
(74) *Attorney, Agent, or Firm*—Oblon, Spivak, McClelland, Maier & Neustadt, P.C.

(57) ABSTRACT

A power supply device for a sliding door includes an extra-length absorbing unit, a door side fixing unit fixed to a sliding door, a flexible tube extending from the extra-length absorbing unit to the door side fixing unit, and a wire harness wired from a vehicle body through the extra-length absorbing unit, the flexible tube and the door side fixing unit to the sliding door. The extra-length absorbing unit includes a case having a gate for the flexible tube, a rotating drum for winding the flexible tube in the case, and a torsion spring for providing a turning force with the rotating drum in a winding direction of the flexible tube. An end portion at the vehicle body of the flexible tube is fixed on the rotating drum, a portion at the vehicle side of the wire harness being fixed to the rotating drum in a vicinity of the end portion of the flexible tube, the flexible tube is wound in a spiral within the rotating drum, a spiral inner peripheral portion thereof being fixed to a center portion of the case, and the flexible tube being pulled out of the case through the gate.

28 Claims, 25 Drawing Sheets clearance being at least 2mm clearance being at least 2mm

POWER SUPPLY DEVICE FOR A SLIDING DOOR

FIELD OF THE INVENTION

The present invention relates to a power supply device for a sliding door for supplying power or transmitting signals to the devices installed in the sliding door from the vehicle body side of the car.

RELATED ART

Devices such as a power window motor, switches, speaker or the like are incorporated inside of the sliding door used for a one-box car, wagon or the like. To supply power from the vehicle body side to the devices, it is necessary to wire a cable (wire harness) from the vehicle body to the sliding door, in addition, to cause the cable to follow the opening and closing of the sliding door.

It is known as this kind of the power supply device for a sliding door that a cable winding unit is installed in the vehicle body side and the extra-length cable which is caused in accordance with the opening and closing of the sliding door is absorbed by winding the cable (refer to Japanese Patent Provisional Publication No. 11-93514).

It is known as other kind of the power supply device for a sliding door that a flexible tube receiving a wire harness is wired with extendible for bent between a prescribed position of the vehicle side and the sliding door, one end of the flexible tube is fixed to the sliding door and the vicinity of the other end of the flexible tube is pivotably supported by the metallic part fixed to the vehicle body (refer to Japanese Patent Provisional Publication No. 2002-79892).

However, in the power supply device for a sliding door as disclosed in Japanese Patent Provisional Publication No. 11-93514, the cable per se is pulled out of the winding unit, and the cable is likely damaged by interfering with other members (i.e., sliding rail). Furthermore, since the winding unit has to pull out or wind the cable having the same length as the stroke of the opening and closing of the sliding door, thus the device becomes bigger.

In addition, in the power supply device for a sliding door as disclosed in Japanese Patent Provisional Publication No. 2002-79892, since the wire harness is received in the flexible tube, the wire harness is not likely damaged. However, the flexible tube receiving the wire harness is necessary to have a sufficient length to absorb the stroke of opening and closing of the sliding door, thus a large space is necessary to wire such a long flexible tube receiving the wire harness with extendible length for bent. Furthermore, when the flexible tube is loosed and interfered with other members, the flexible tube with wire harness is likely damaged, and the noise is generated.

SUMMARY OF THE INVENTION

One of the object of the invention is to provide a power supply device for a sliding door enabling to be downsized, in which the flexible tube and wire harness received therein ranging from the vehicle body side to the sliding door is not likely damaged, and the flexible tube is bent and moved in a relatively small space.

A power supply device for a sliding door of the invention comprises an extra-length absorbing unit, a door side fixing unit fixed to a sliding door, a flexible tube extending from said extra-length absorbing unit to said door side fixing unit, and a wire harness wired from a vehicle body through said extra-length absorbing unit, said flexible tube and said door side fixing unit to the sliding door, wherein said extra-length absorbing unit includes a case having a gate for said flexible tube, a rotating drum for winding said flexible tube in the case, and a torsion spring for providing a turning force with said rotating drum in a winding direction of said flexible tube, an end portion at the vehicle body of said flexible tube being fixed on the rotating drum, a portion at the vehicle side of said wire harness being fixed to the rotating drum in a vicinity of the end portion of said flexible tube, said flexible tube being wound in spiral within the rotating drum, a spiral inner peripheral portion thereof being fixed to a center portion of the case, and said flexible tube being pulled out of the case through the gate, said door side fixing unit holds a sliding door side end portion of said flexible tube, a sliding door side portion of said wire harness being pulled out of the end portion of the flexible tube into the sliding door, and said extra-length absorbing unit is fixed to the vehicle body so as to be located in an intermediate position of a moving range of the door side fixing unit by an opening and closing movements of the sliding door, said flexible tube being provided with a tensile force by the turning force of the rotating drum from the extra-length absorbing unit to said door side fixing unit.

As the torsion spring of the extra-length absorbing unit, a coiled spring or a spiral spring may be used, however, the coiled spring is preferable in view of down-sizing, and easy designing.

In the power supply device for a sliding door of the invention, said wire harness comprises one sheet or plurality sheets of flat cable, said flexible tube comprises a corrugated tube having a cross section of a longer vertical portion than a horizontal portion in which said one sheet or plurality sheets of flat cable are received with the width thereof vertically directed. The corrugated tube preferably includes a rib formed running along a longitudinal direction on at least one of an upper surface and lower surface thereof.

In the power supply device for a sliding door of the invention, a guide for restricting a bend radius of said flexible tube within a prescribed range is provided on the gate for the flexible tube in said extra-length absorbing unit. A reinforcing wall portion for preventing the guide from flexing is preferably provided at a back side of said guide.

In the power supply device for a sliding door of the invention, said door side fixing unit is fixed to the sliding door in such manner that said flexible tube goes out to a forward direction or a backward direction of the sliding door, and a guide for restricting a bend radius of said flexible tube within a prescribed range is preferably provided in a vicinity of an exit port of said flexible tube in said extra-length absorbing unit.

In the power supply device for a sliding door of the invention, said door side fixing unit comprises a fixing member for being fixed to the sliding door, a tube end clamp for being pivotably fixed in a plane perpendicular to a longitudinal axis of the fixing member, and a restricting portion for restricting the tube end clamp to pivot within a prescribed range may be provided with said fixing member.

In the power supply device for a sliding door of the invention, the case of said extra-length wire harness absorbing nit comprises a lower case, an upper case, and a sub-cover for fixing an inner peripheral portion of a wound wire harness in spiral to a center portion of the case, a main axis portion inserted into a hollow axis portion of the rotating drum is formed in the lower case, a central cylindrical portion is formed in the upper case so as to be positioned at an outer peripheral of the hollow axis portion of the rotating drum, the sub-cover is attached to the central cylindrical portion so as not to rotate, the torsion spring comprises a coiled spring, and the coiled spring is preferably incorporated between the lower case and the rotating drum in such condition that the coiled spring is turned so that the turning force is given to the rotating drum in a direction of winding the flexible tube.

In the power supply device for a sliding door of the invention, the case of said extra-length wire harness absorbing nit comprises a lower case, an upper case, and a sub-cover for fixing an inner peripheral portion of a wound wire harness in spiral to a center portion of the case, a main axis portion inserted into a hollow axis portion of the rotating drum is formed in the lower case, the sub-cover is attached to the main axis portion so as not to rotate, the torsion spring of the extra-length absorbing unit comprises a coiled spring, and the coiled spring is preferably incorporated between the lower case and the rotating drum in such condition that the coiled spring is turned so that the turning force is given to the rotating drum in a direction of winding the flexible tube.

In the power supply device for a sliding door of the invention, a stopper for restricting a rotation angle of the rotating drum is preferably provided respectively on a lower surface of a bottom portion of the rotating drum, and a corresponding upper surface of a bottom portion of the lower case.

In the power supply device for a sliding door of the invention, a cutout portion for preventing foreign material from being collected is provided on a bottom portion in the case for the gate of the flexible tube, a gap larger than a size of foreign material likely entering into the case is provided between the case and the rotating drum, a slant surface and a through hole are formed on the bottom surface of the lower case so as to discharge the foreign material entered into the case, and a rib is preferably provided on a coiled spring receiving portion so that the coiled spring is placed with a space from the bottom surface of the lower case.

In the power supply device for a sliding door of the invention, an extended piece for restricting upward and downward movement of the flexible tube wound around the rotating drum is preferably provided on an upper end portion of the rotating drum toward outward thereof.

In the power supply device for a sliding door of the invention, the sub-cover preferably includes a fitting portion for fitting to an upper end of the main axis portion of the lower case and a guide passage for guiding the flat cable over the rotating drum to outside of the case, outer end of the guide passage being fixed to an outer peripheral portion of the lower case. In this case, a groove-shaped cover portion is preferably formed on the upper case, to which an upper face of the sub-cover is fitted.

In the power supply device for a sliding door of the invention, an opening portion is preferably formed, for easy assembling, on a bottom plate portion of the rotating drum at a position corresponding to a portion to which an end portion of the coiled spring is come into contact.

In the power supply device for a sliding door of the invention, an upper end of the coiled spring is positioned above a lower end of the coiled spring receiving portion, and a distance (Q) from the upper end of the coiled spring to the upper end face of the coiled spring receiving portion of the rotating drum is formed so as to be larger than a distance (R) from the upper end of the coiled spring to the lower end of the coiled spring receiving portion of the rotating drum, when the upper face of the stopper provided in the lower case for restricting the rotation angle is contacted with the lower face of the stopper provided in the rotating drum for restricting the rotation angle in assembling of the rotating drum, the lower case and the coiled spring.

In the power supply device for a sliding door of the invention, the rotating drum, the lower case and the coiled spring are preferably formed, for easy assembling, in such manner that a coiled spring which is not turned and a lower case are arranged so as not to be relatively rotated, and a coiled spring which is not turned and a rotating drum are arranged so as not to be relatively rotated, thus, the upper face of the stopper provided in the lower case for restricting the rotation angle is contacted with the lower face of the stopper provided in the rotating drum for restricting the rotation angle, and then, the rotating drum is turned in a direction to give a prescribed rotation angle to the coiled spring and is pushed toward the lower case, thus the stopper in the lower case is engaged to the stopper in the rotating drum.

DETAILED DESCRIPTON OF THE INVENTION

FIRST EMBODIMENT

Figure 1:
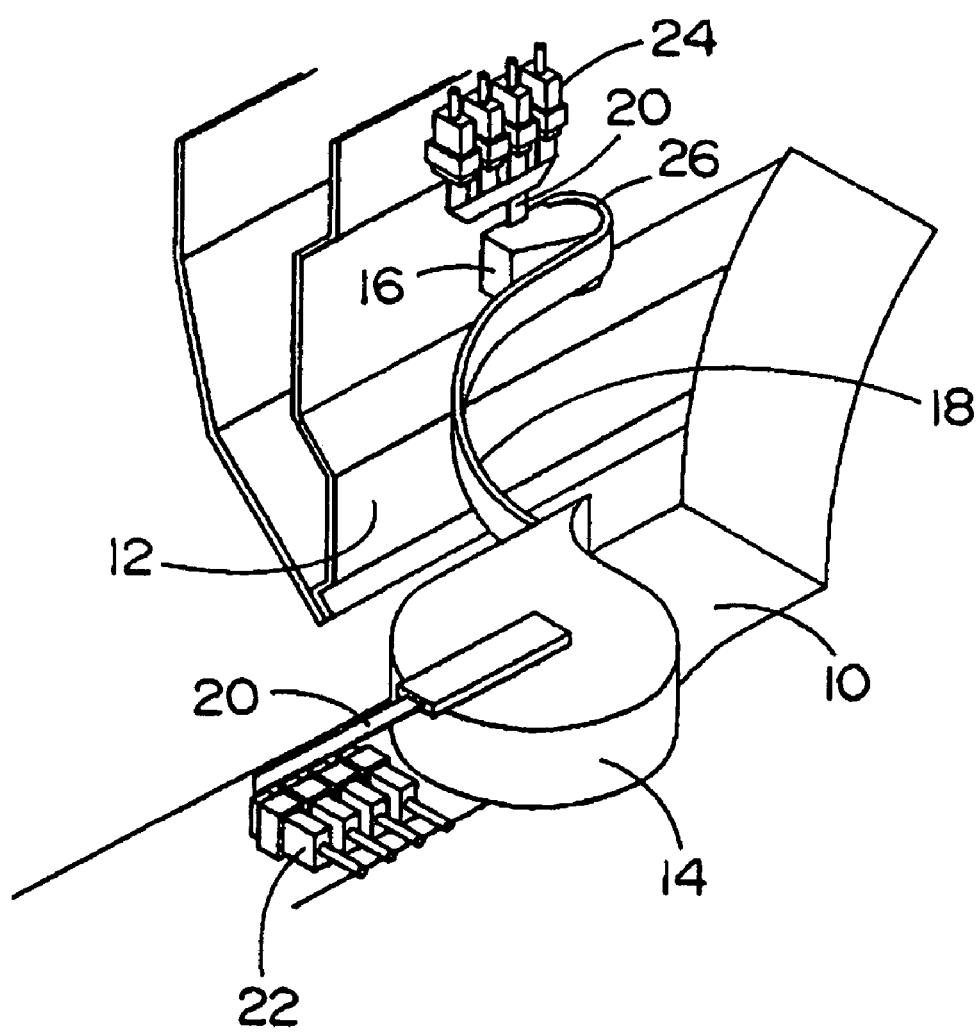
FIG. 1 is a schematic oblique view showing the power supply device for a sliding door of the invention as a whole.

FIGS. 1 to 10 show embodiments of the present invention. FIG. 1 shows the power supply device for a sliding door of the invention. In FIG. 1, the reference numerals indicate the following respectively: 10 is a vehicle body, 12 is a sliding door, 14 is an extra-length absorbing unit fixed to the vehicle body 10, 16 is a door side fixing unit fixed to a sliding door 12, 18 is a flexible tube ranging from the extra-length absorbing unit to the door side fixing unit 16, 20 is a flat cable (i.e., flat wire harness) ranging from the vehicle body 10 through the extra-length absorbing unit 14, the flexible tube 18, the door side fixing unit 16 to the sliding door 12, 22 is a connector attached to the end portion of the flat cable 20 at the side of the vehicle body 10, and 24 is a connector attached to the end portion of the flat cable 20 at the side of the sliding door 12.

Figure 2:
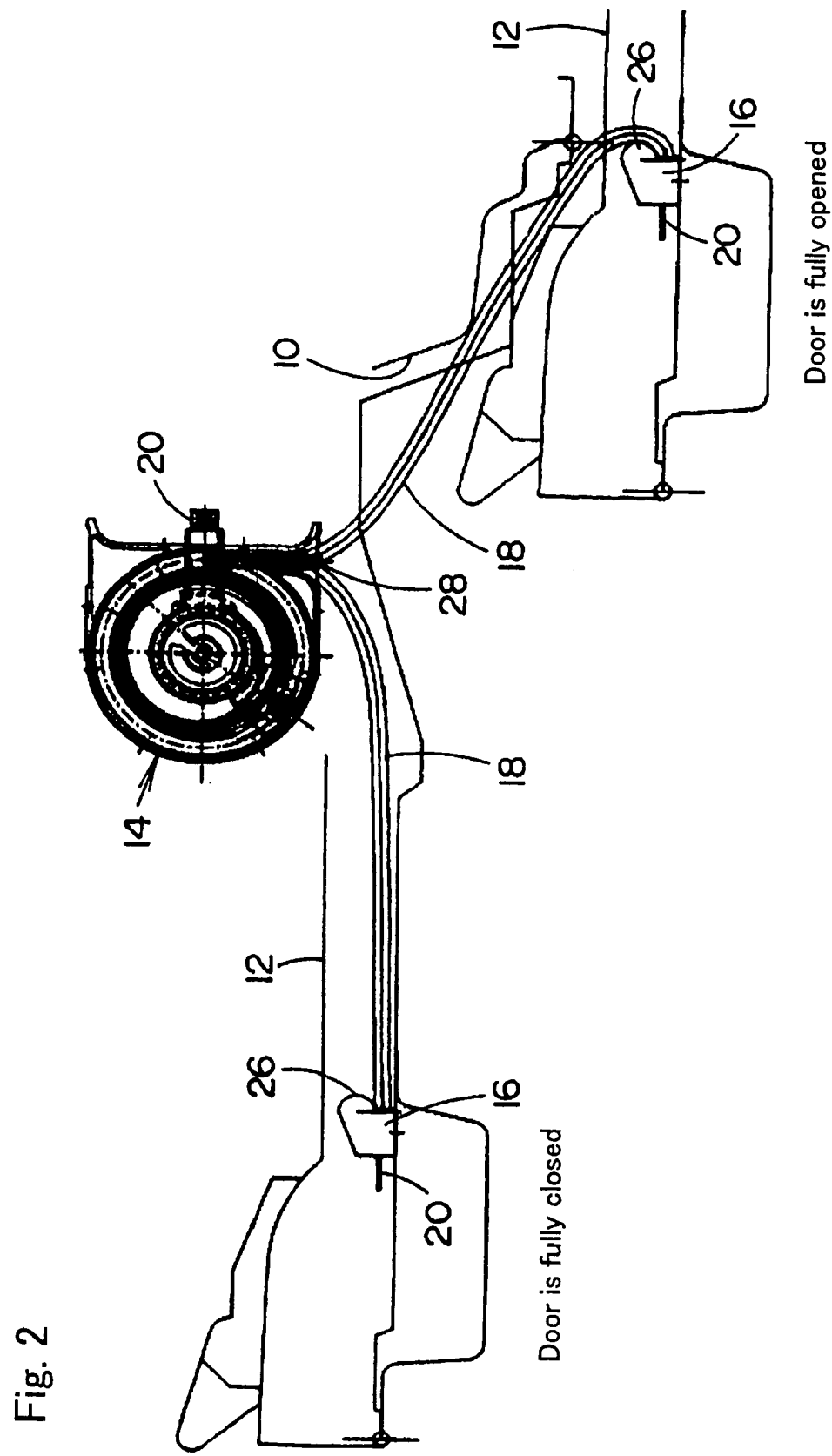
FIG. 2 is a plan view showing one embodiment of the power supply device for a sliding door of the invention together with the sliding door fully closed and fully opened.
Figure 3:
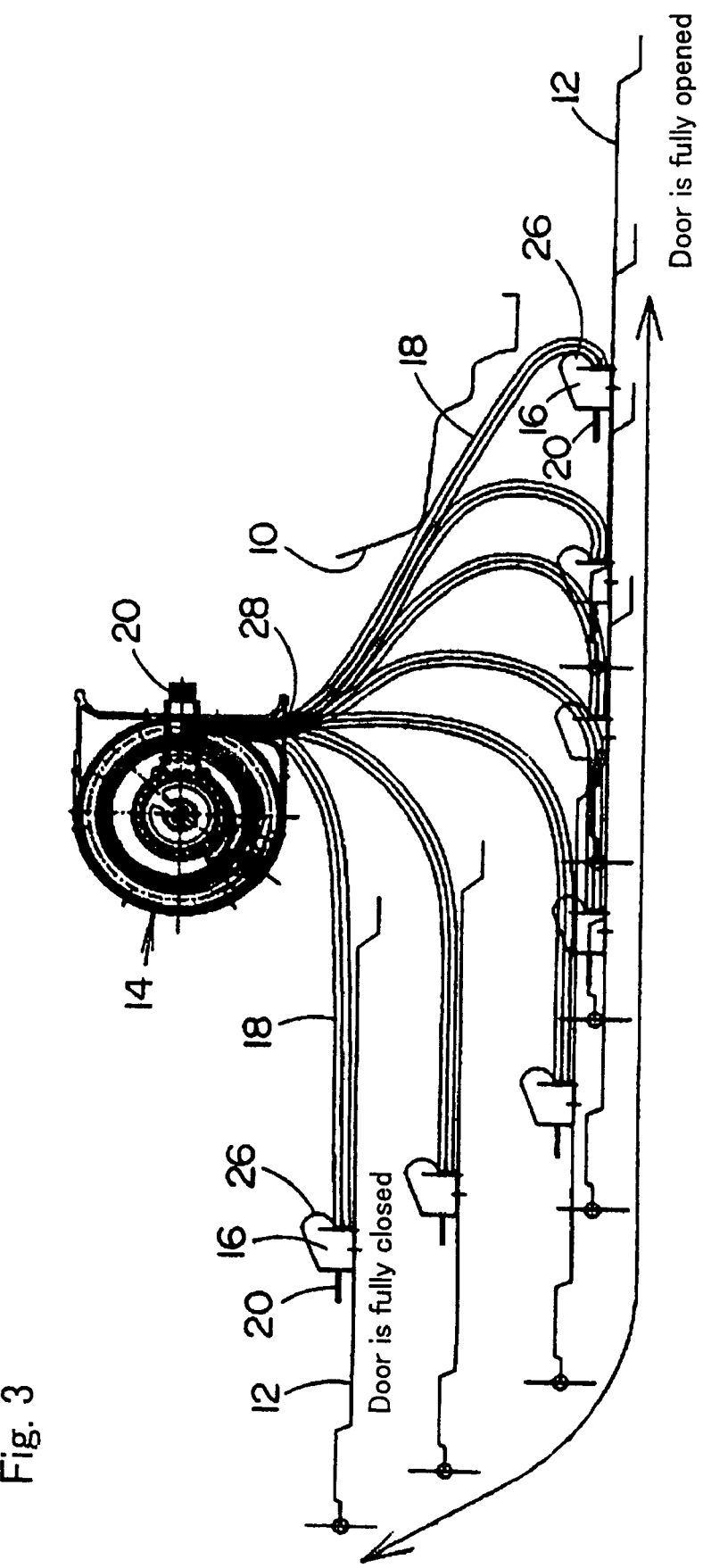
FIG. 3 is a plan view showing a trace of the bent flexible tube which moves from the point in which the sliding door is fully closed to the point in which the sliding door is fully opened.
Figure 4:
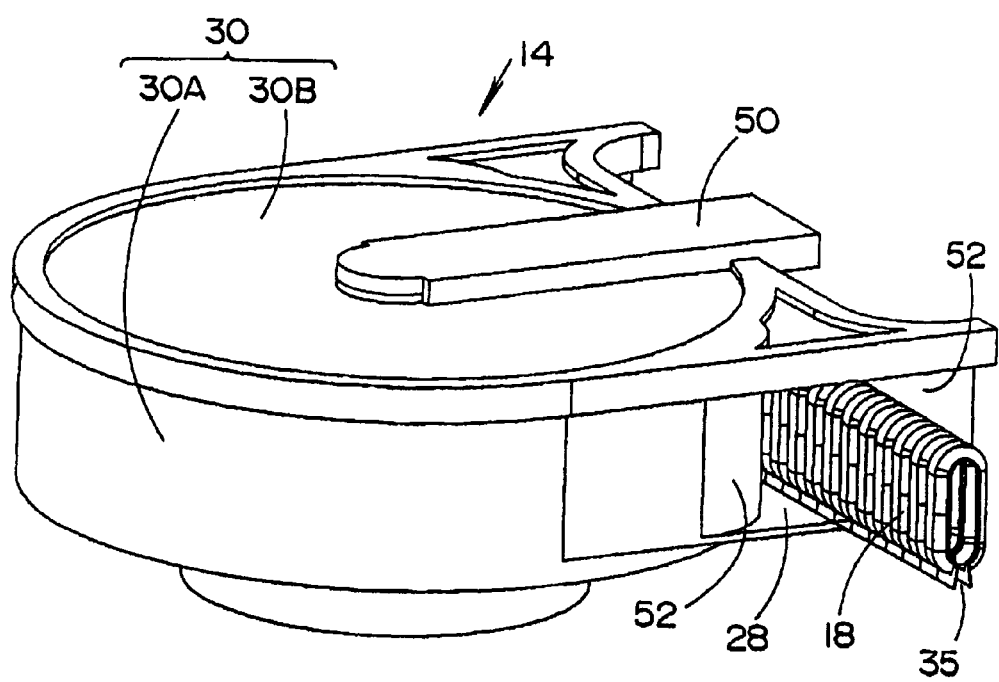
FIG. 4 is an oblique view from the upper side showing an extra-length absorbing unit applied to the power supply device for a sliding door of the invention as shown in FIG. 2.
Figure 5:
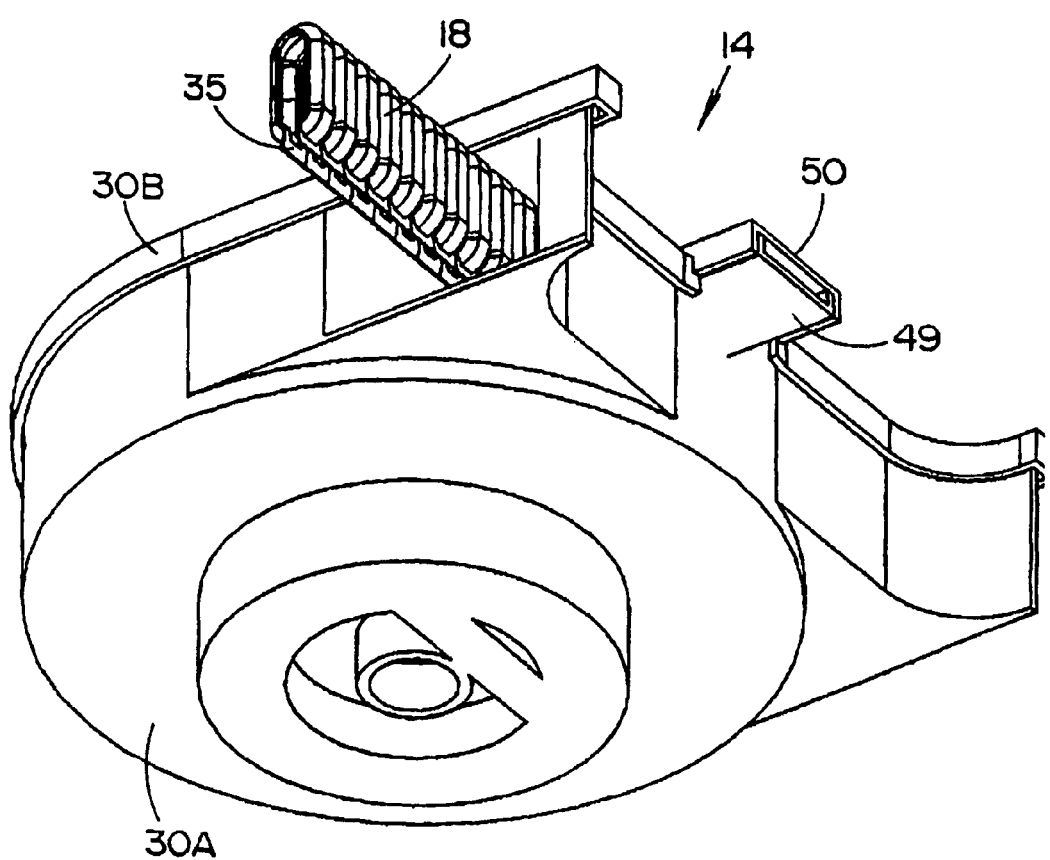
FIG. 5 is an oblique view from the lower side showing an extra-length absorbing unit applied to the power supply device for a sliding door of the invention.

FIG. 2 shows the power supply device for a sliding door in case that the sliding door is fully closed and fully opened. The extra-length absorbing unit 14 is fixed to the vehicle body 10 so as to be located in an intermediate position of a forward and backward moving range of the door side fixing unit 16 by an opening and closing movements of the sliding door 12. FIG. 3 shows a trace of the bent flexible tube 18 which moves from the point in which the sliding door 12 is fully closed to the point in which the sliding door 12 is fully opened, and vice versa.

The door side fixing unit 16 holds an end portion of the flexible tube 18 at the side of the sliding door 12.

In the embodiment, the door side fixing unit 16 is fixed to the sliding door 12 in such manner that the flexible tube 18 goes out to a backward direction of the sliding door. The door side fixing unit 16 includes a guide 26 for restricting a bend radius of the flexible tube 18. The guide 26 functions to prevent the flexible tube 18 from being bent over a prescribed bend radius (i.e., avoiding that the bend radius becomes smaller than the prescribed bend radius) when the sliding door is fully opened. The portion of the flat cable 20 at the side of the sliding door 12 is pulled out of the end portion of the flexible tube 18 into the sliding door 12. The flat cable 20 is fixed to the door side fixing unit 16 (or a portion of the sliding door) in a vicinity of the end portion of the flexible tube 18 so that the flat cable is not pulled into the flexible tube 18.

FIGS. 4 to 10 show the construction of the extra-length absorbing unit 14. The extra-length absorbing unit 14 includes a case 30 having a gate 28 for the flexible tube 18, a rotating drum 32 for winding the flexible tube 18 in the case 30, and a coiled spring 34 for providing a turning force with the rotating drum 32 in a winding direction of the flexible tube 18. The flexible tube comprises a corrugated tube having a cross section of a longer vertical portion than a horizontal portion in which the flat cable is inserted into the flexible tube 18 with the width thereof vertically directed. A cut portion 35 is formed in the flexible tube 18 along the longitudinal direction so that the flat cable 20 is easily inserted into the flexible tube.

Figure 8A:
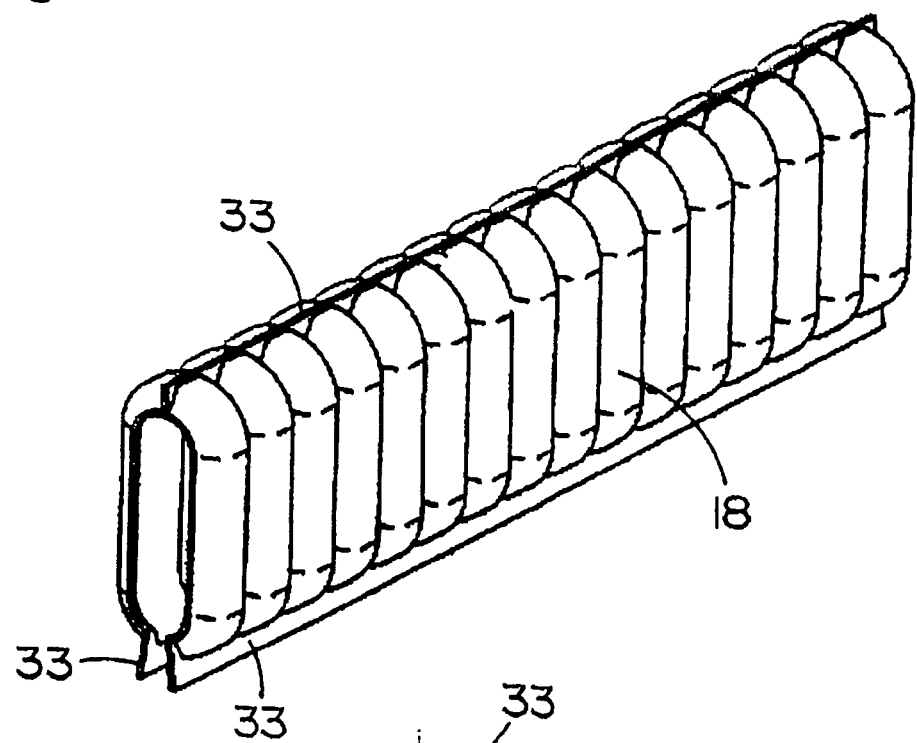
FIG. 8A is an oblique view showing a preferable embodiment of a flexible tube of the invention.
Figure 8B:
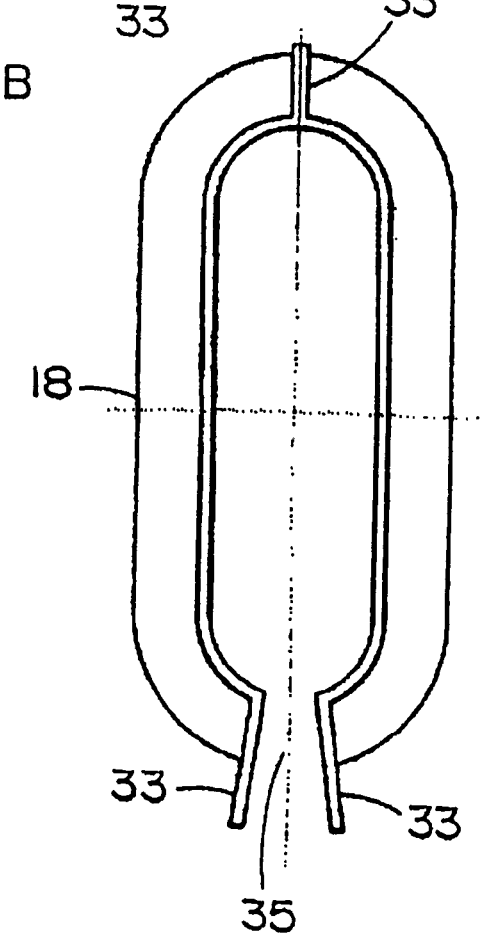
FIG. 8B is a front view showing a preferable embodiment of a flexible tube of the invention.

The corrugated tube 18 has preferably a rib 33 formed along the longitudinal direction on the upper face and the lower face of the tube, as shown in FIG. 8. With the above rib 33 formed on the corrugated tube, it is possible to suppress the extension of the corrugated tube 18 when the tensile force is applied to the corrugated tube 18, thus the winding length in the extra-length absorbing unit 14 can be shortened to realize the downsizing of the extra-length absorbing unit 14. Furthermore, since the rib 33 is formed on the upper and lower faces of the corrugated tube 18, the flexibility of the corrugated tube 18 may be maintained.

Figure 6:
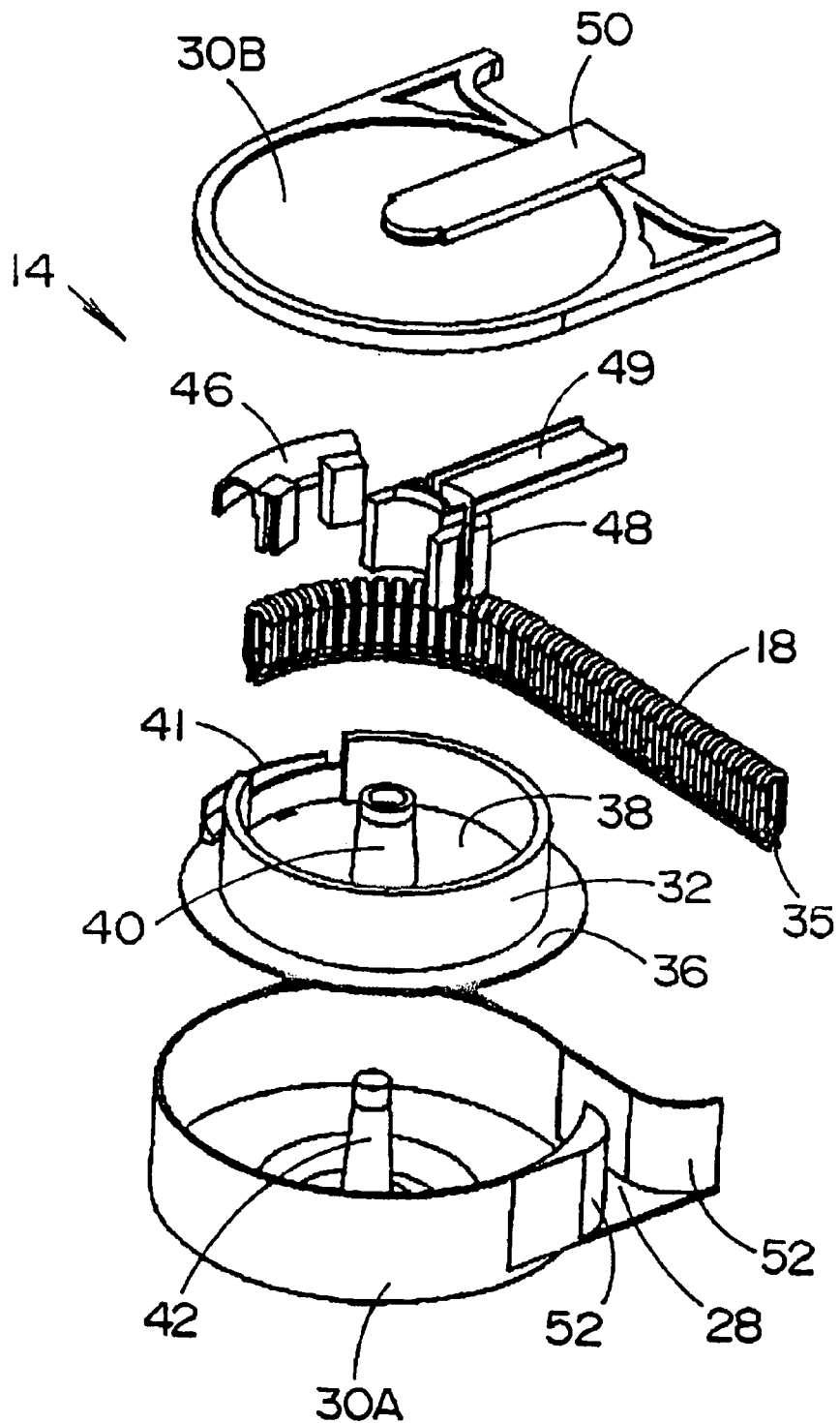
FIG. 6 is an oblique disassembled view of an extra-length absorbing unit applied to the power supply device for a sliding door of the invention.
Figure 7:
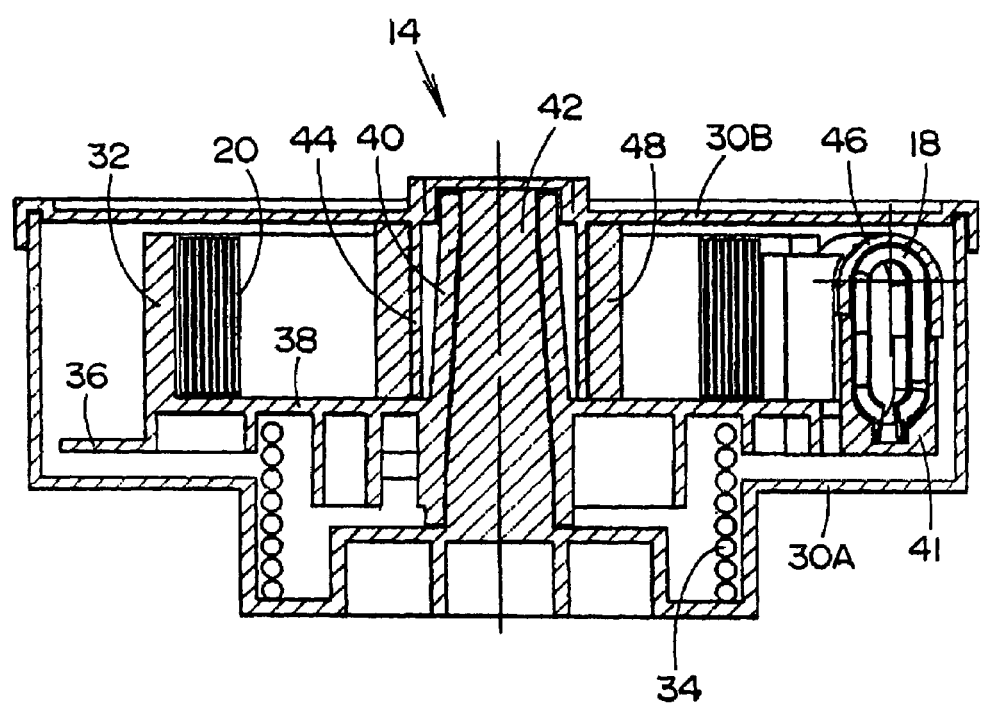
FIG. 7 is a cross sectional view of an extra-length absorbing unit applied to the power supply device for a sliding door of the invention.

A flange portion 36, a circular bottom plate 38, and a hollow axis portion are integrally formed with the rotating drum 32, as shown in FIGS. 6 and 7. A fixing portion 41 for the flexible tube 18 is formed on a part of a peripheral portion of the flange portion 36. The case 30 comprises a lower case 30A and an upper case 30B. A main axis 42 is formed in the lower case 30A, which is inserted into the hollow axis portion 40 of the rotating drum 32, and a central cylindrical portion 44 is formed in the upper case 30B, which is positioned on an outer peripheral of the hollow axis portion 40 of the rotating drum 32. The rotating drum 32 rotates around the main axis 42 of the lower case 30A.

An end portion of the flexible tube 18 at the side of the vehicle body is fixed to the rotating drum by a fixing component 46 (refer to FIGS. 6 and 10). The fixing component 46 is formed so as to pinch the end portion of the flexible tube 18 together with the fixing portion 41 of the rotating drum 32. The flat cable 20 in the case 30 enters in the inside of the rotating drum 32 in the vicinity of the end portion of the flexible tube 18, and then is fixed to the rotating drum 32 by the fixing component 46. The flat cable 20 is wound in spiral on the bottom plate 38 within the rotating drum, and the inner peripheral portion thereof is fixed to the central cylindrical portion 44 of the upper case 30B by a sub-cover 48 (refer to FIGS. 6, 7 and 10). The flat cable 20 thus fixed to the central cylindrical portion 44 is pulled out of the case 30 through a guide passage 49. A groove-shaped cover portion 50 to which the upper face portion (including the guide passage 49) of the sub-cover 48 is to be fitted is integrally formed with the upper case 30B.

A coiled spring 34 is incorporated between the lower case 30A and the bottom plate 38 of the rotating drum 32. More specifically, one end is fixed to the lower case 30A, and the other end is fixed to the rotating drum 32 in such condition that the coiled spring is turned so that the turning force is given to the rotating drum 32 in a direction of winding the flexible tube 18. Thus, a tensile force is given to the flexible tube 18 ranging from the extra-length absorbing unit 14 to the door side fixing unit 16 by the turning force of the rotating drum 32.

Figure 9:
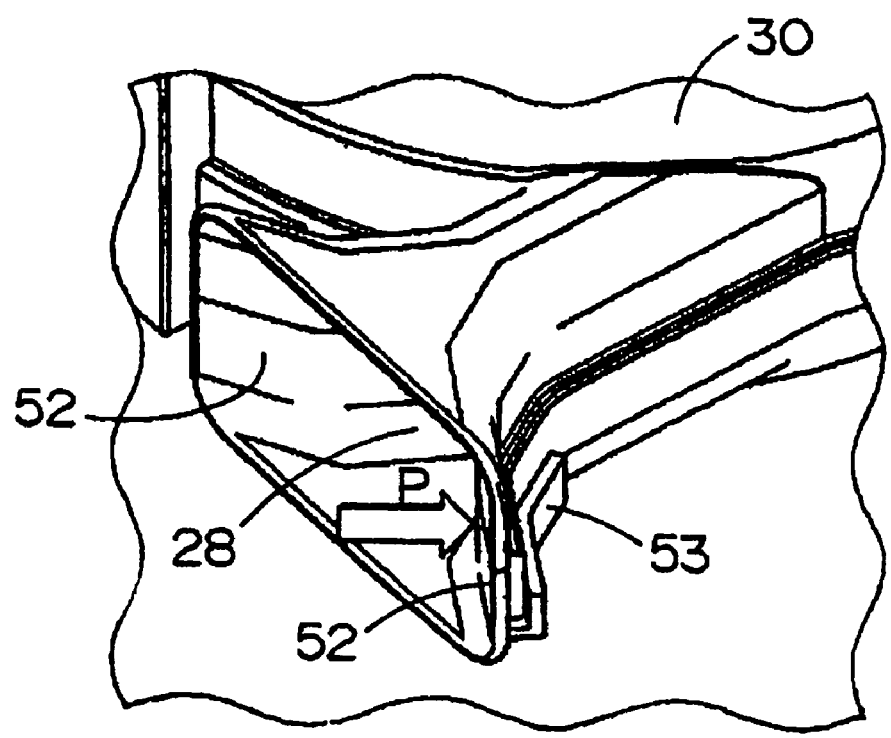
FIG. 9 is an oblique view showing a preferable embodiment of a gate in the case for the flexible tube.

In addition, a horn-shaped guide 52 is formed on both ends of the gate in the case 30 for the flexible tube for restricting the bend radius of the flexible tube 18. A reinforcing wall portion 53 is provided on the back side of the guide 52 for preventing the guide from flexing, as shown in FIG. 9. The wall portion is provided by the following reason. More specifically, the flexible tube 18 is pushed to the guide 52 and thus the load is charged to the guide 52 when the flexible tube 18 is pulled out of the extra-length absorbing unit 14 by the opening and closing of the sliding door. The load becomes maximum when the sliding door is fully closed or fully opened. The guide 52 is to be flexed as depicted by an arrow when the load is charged to the guide 52, however, the reinforcing wall portion 53 thus provided may prevent the guide 52 from flexing. Thus, the original shape of the guide 52 may be maintained at a higher reliability to improve reliability of the power supply device for a sliding door.

Figure 10A:
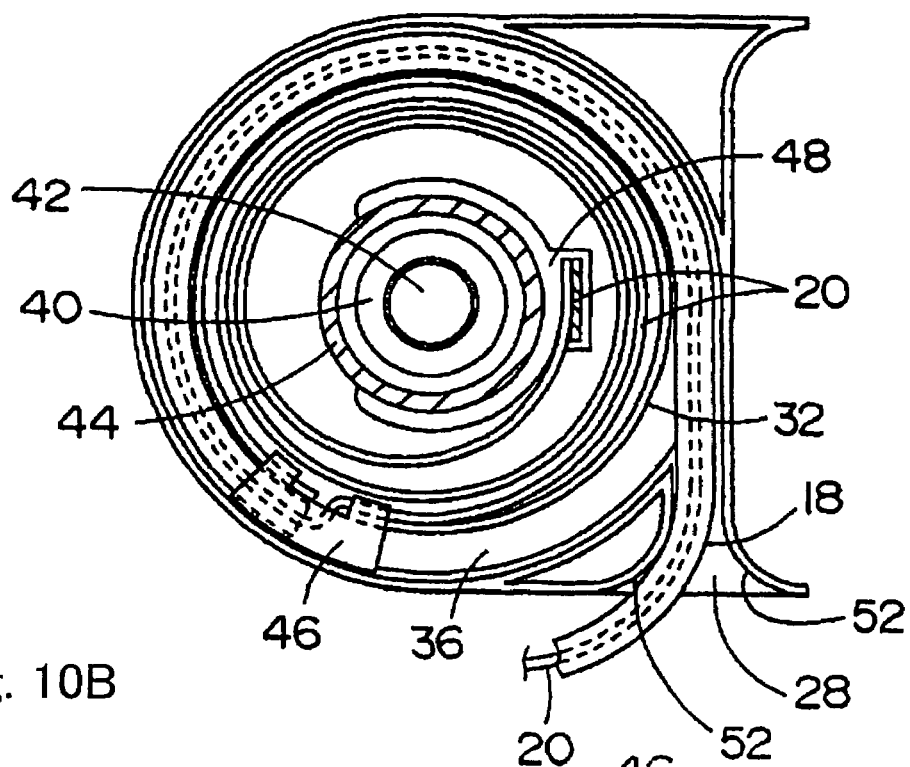
FIG. 10A is a plan view showing the inside of the extra-length absorbing unit applied to the power supply device for a sliding door of the invention as shown in FIG. 2 in which the sliding door is fully closed.
Figure 10B:
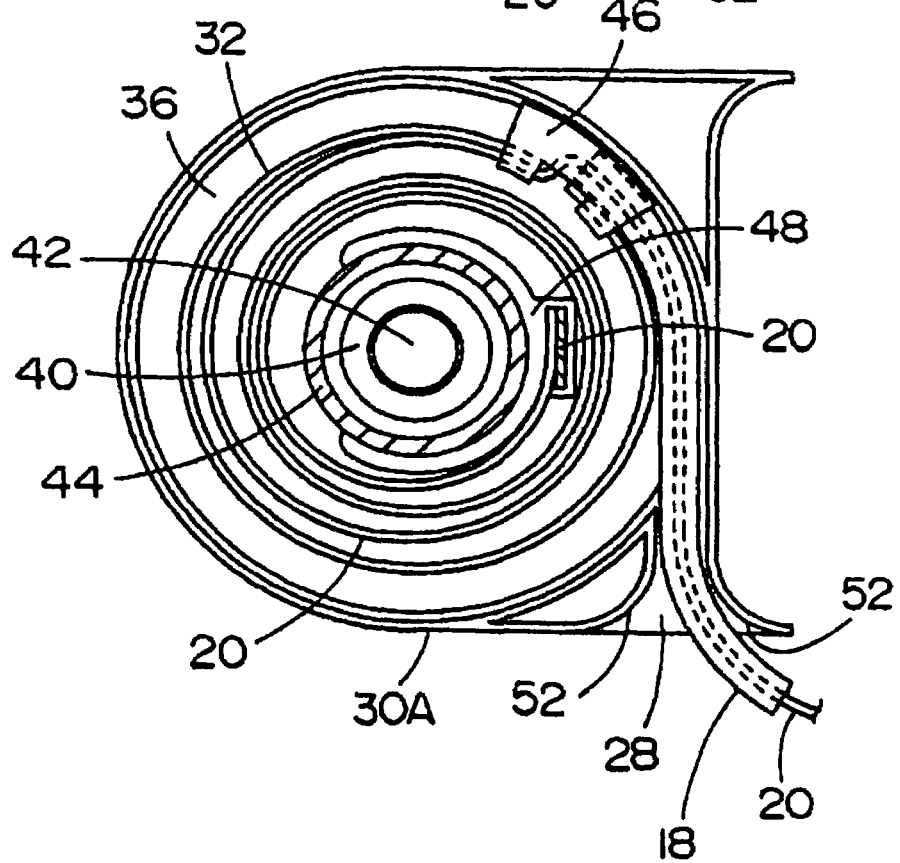
FIG. 10B is a plan view showing the inside of the extra-length absorbing unit in which the sliding door is fully opened.

The construction of one embodiment of the power supply device for a sliding door is explained as above. Then, an operation of the power supply device for a sliding door is explained. The tensile force is always charged to the flexible tube 18, since a turning force is given to the rotating drum by the coiled spring in a direction to winding the flexible tube. FIG. 10 shows inside of the extra-length absorbing unit. FIG. 10A shows the situation in which the sliding door 12 is fully closed, and FIG. 10B shows the situation in which the sliding door 12 is fully opened. In the embodiment, as shown in FIG. 2, a route of the flexible tube from the gate for the flexible tube in the extra-length absorbing unit 14 to the door side fixing unit 16 is a little longer when the sliding door is fully opened than when the sliding door is fully closed. More specifically, the extra-length of the flexible tube 18 is long when the sliding door 12 is fully closed, while the extra-length of the flexible tube 18 is short when the sliding door 12 is fully opened. Therefore, the length of winding the flexible tube 18 by the rotating drum 32 is long when the sliding door is fully closed as shown in FIG. 10A, while the length of winding the flexible tube 18 by the rotating drum 32 is short when the sliding door is fully opened as shown in FIG. 10B. The flat cable 20 received as wound in spiral within the rotating drum 32 extends so as to apart from the main axis when the rotating drum rotates in a direction to winding the flexible tube 18 as shown in FIG. 10A. On the other hand, the flat cable 20 received as wound in spiral within the rotating drum 32 is fastened so as to approach toward the main axis when the rotating drum rotates in a direction to unwinding the flexible tube 18 as shown in FIG. 10B.

As described above, the extra-length absorbing unit 14 winds or unwinds the flexible tube 18. Since the length of winding the flexible tube 18 by the rotating drum 32 is the same as the difference between the maximum extra-length and the minimum extra-length, the length of winding the flexible tube may be small. Thus, the length of winding the flexible tube may be less than one round of the rotating drum as shown in FIG. 10 so that it is possible to prevent the extra-length absorbing unit 14 from being a bigger size.

The trace of the bent flexible tube 18 which moves from the point in which the sliding door 12 is fully closed to the point in which the sliding door 12 is fully opened, and vice versa is maintained as almost constant, as shown in FIG. 3 due to the facts that the tensile force is charged to the flexible tube 18, the flexible tube 18 has a some extent of flexural rigidity, and the bent radius of the flexible tube 18 is restricted by the guide in the gate 18 of the extra-length absorbing unit 14 and the guide 26 of the door side fixing unit 16. Therefore, the flexible tube is not likely interfered with other member even if there is provided narrow space, thus enabling to prevent noise or damage from occurring.

Furthermore, even though the extra-length absorbing unit 14 is arranged under the step of the vehicle body, the extra-length absorbing unit 14 is safely protected even if the weight is charged thereto through the step, because the case 30 has the main axis 42 so that the strength of the case in the direction along the axis is high.

Figure 11:
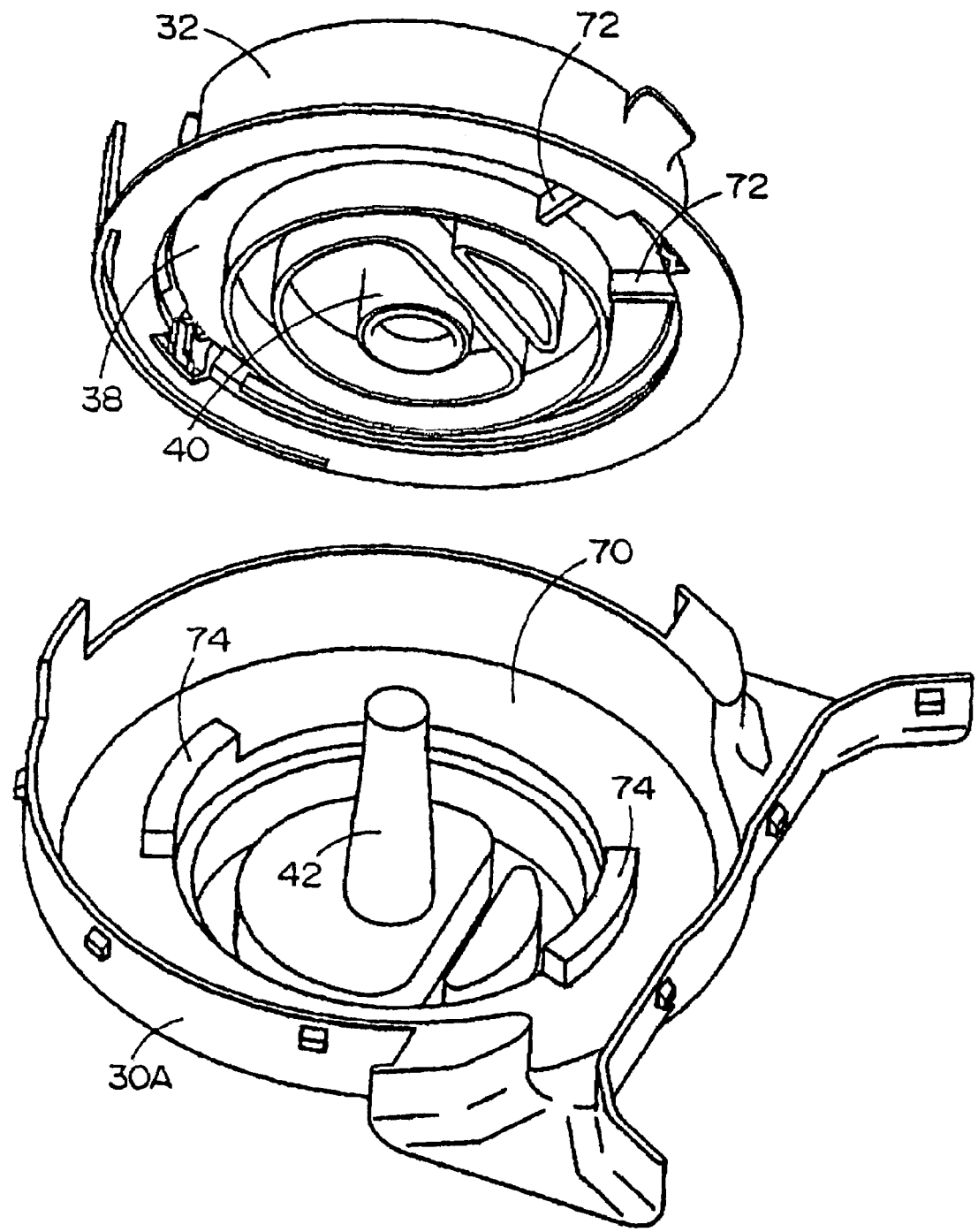
FIG. 11 is an oblique view showing the opposing faces of the lower case and the rotating drum of the extra-length absorbing unit.
Figure 12:
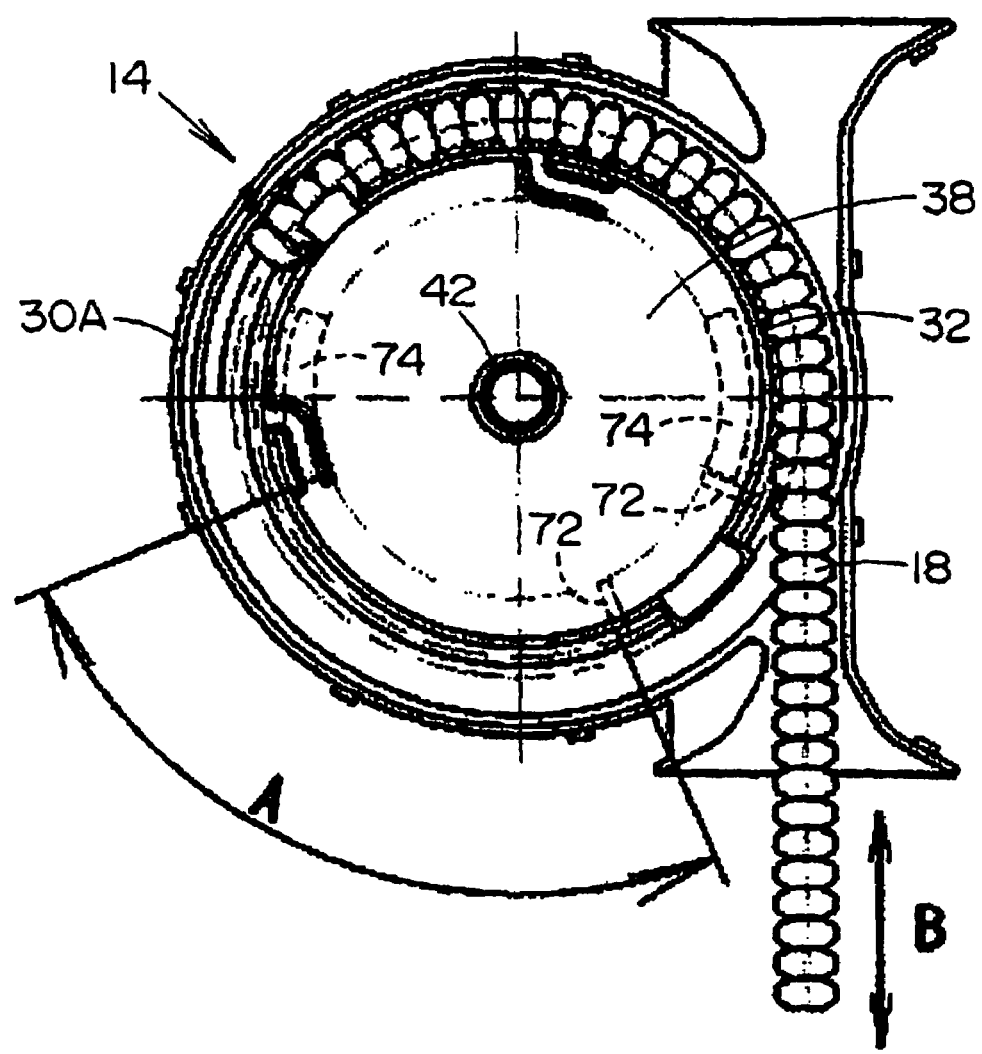
FIG. 12 is a plan view showing the rotation angle of the rotating drum and the absorbed extra-length of the flexible tube.

Preferable structures of the extra-length absorbing unit 14 are explained in detail. FIG. 11 shows the opposing faces of the lower case 30A and the rotating drum 32 of the extra-length absorbing unit 14. The stoppers 72, 74 for restricting the rotation angle of the rotating drum 32 are provided respectively on the lower face of the bottom plate 38 of the rotating drum 32, and opposing upper face of the bottom plate 70 of the lower case 30A. The stopper 72 in the rotating drum 32 and the stopper 74 is the lower case 30A are formed so as to butt each other at the respective positions of the prescribed maximum winding (minimum unwinding) and minimum winding (maximum unwinding). The rotation angle A of the rotating drum 32 is restricted by the respective positions of the stoppers 72, 74 as shown in FIG. 12, thereby the extra-length B of the flexible tube 18 may be determined.

Figure 13A:
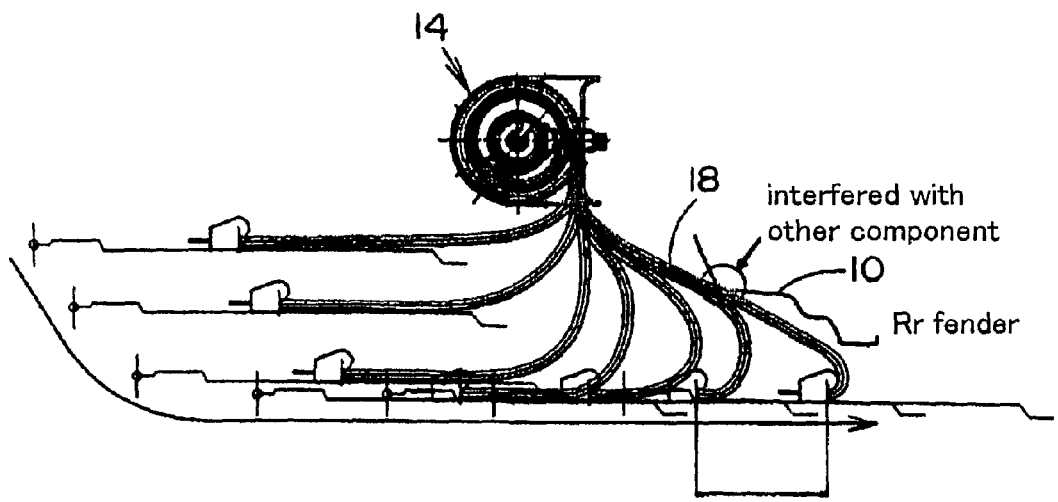
FIG. 13A is a view explaining the flexible tube with weak tensile strength when the sliding door is fully opened.
Figure 13B:
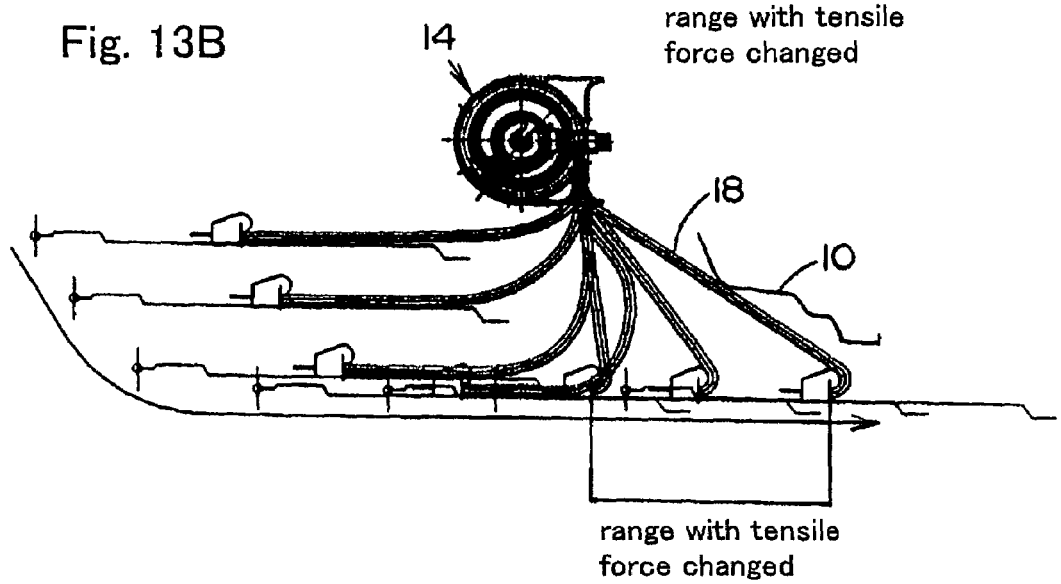
FIG. 13B is a view explaining the flexible tube with tensile strength applied prior to the full opening of the sliding door.

The relative position of the stoppers 72, 74 is preferably arranged so that the tensile force is to be charged to the flexible tube prior to the full opening of the sliding door (i.e., the tensile force is larger than the turning force of the coiled spring 34). The reason thereof is as follows: it is sufficient that the extra-length absorbing unit 14 winds the difference of the flexible tube between the maximum extra-length and the minimum extra-length, however, the flexible tube looses in the way of the full opening of the sliding door as shown in FIG. 13A, when only the above difference is wounded, thus the flexible tube is likely interfered with such a component of the vehicle as Rr fender. When the relative position of the stoppers 72, 74 is arranged so that the tensile force is to be charged to the flexible tube prior to the full opening of the sliding door, the loose of the flexible tube becomes small in the way of the full opening of the sliding door, thus it is possible to prevent the flexible tube from being interfered with such a component of the vehicle as Rr fender.

Figure 14:
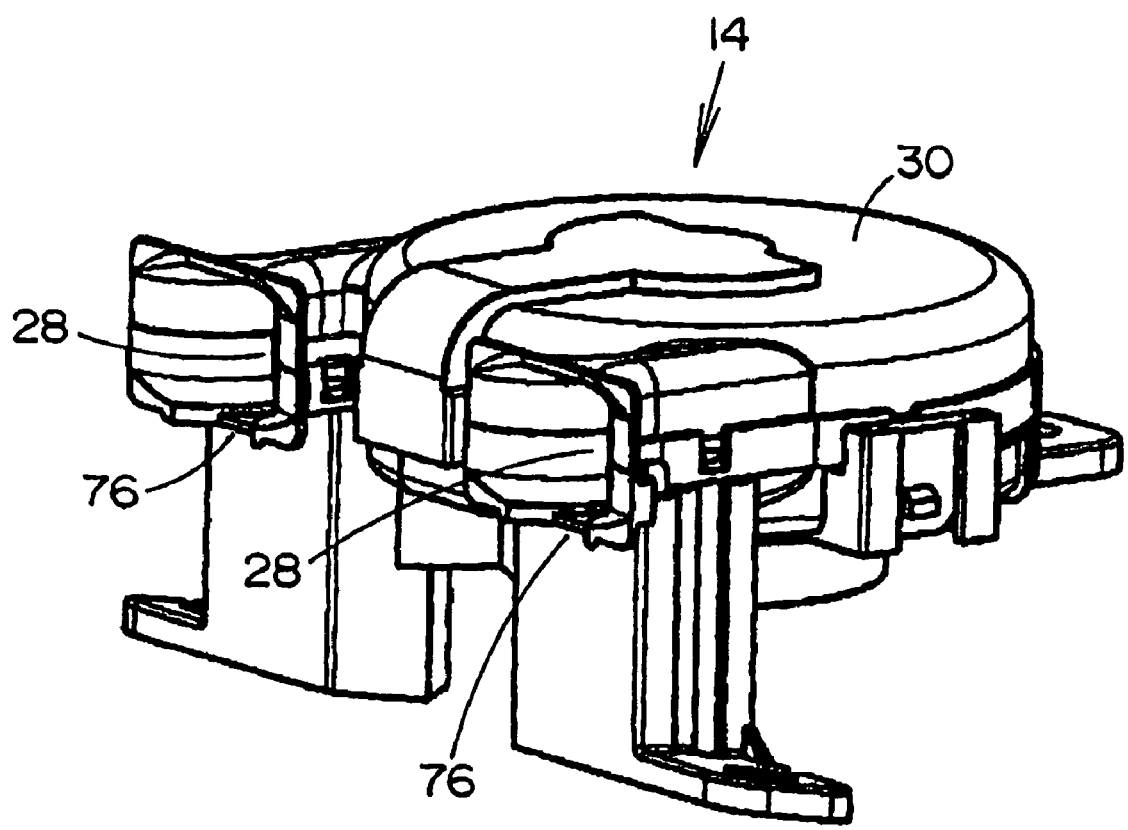
FIG. 14 is an oblique view showing the situation in which the cutout portion is provided on the bottom portion of the gate in the case for the flexible tube.
Figure 15A:
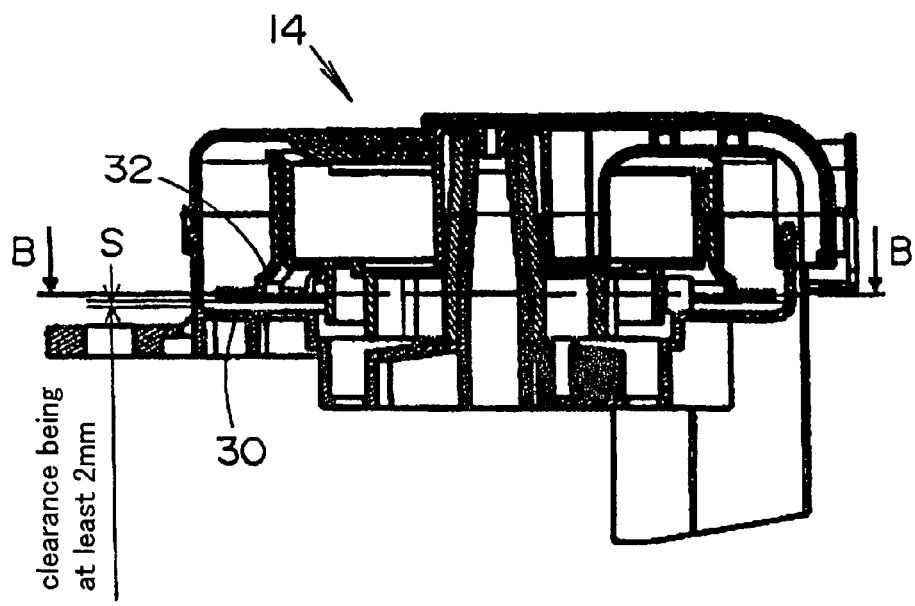
FIG. 15A is a cross sectional view showing a gap along the axis between the lower case and the rotating drum.
Figure 15B:
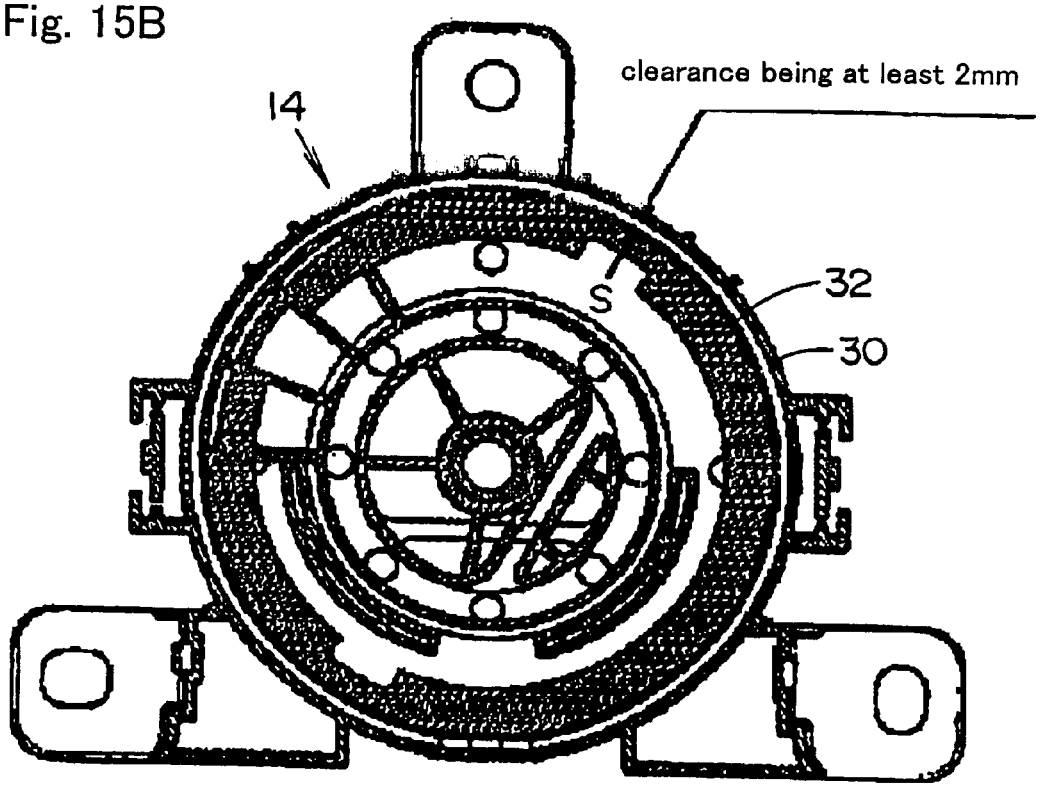
FIG. 15B is a cross sectional view along B—B line showing a gap along the radius direction between the lower case and the rotating drum.
Figure 16A:
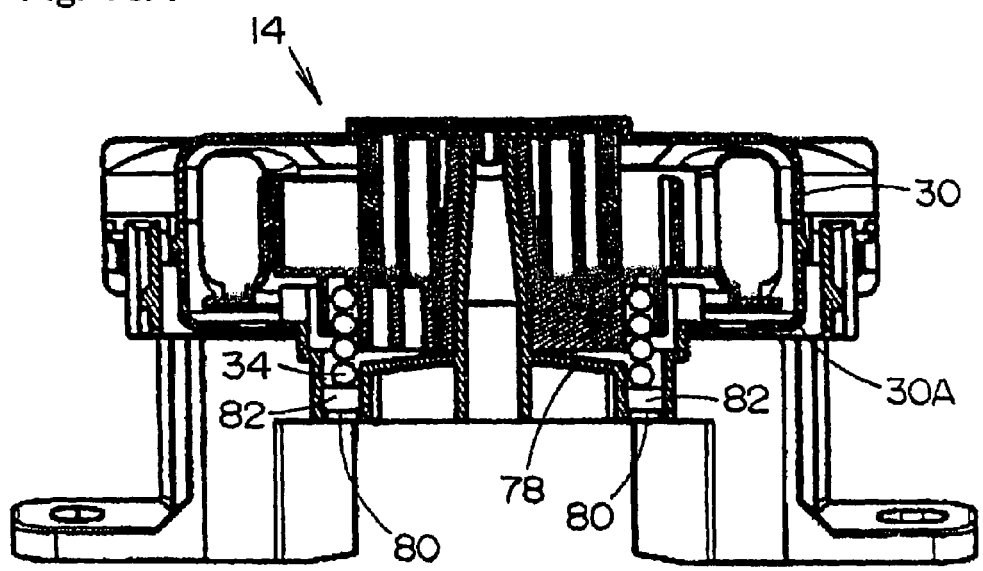
FIG. 16A is a cross sectional view showing a discharge structure for foreign material entered into the case.
Figure 16B:
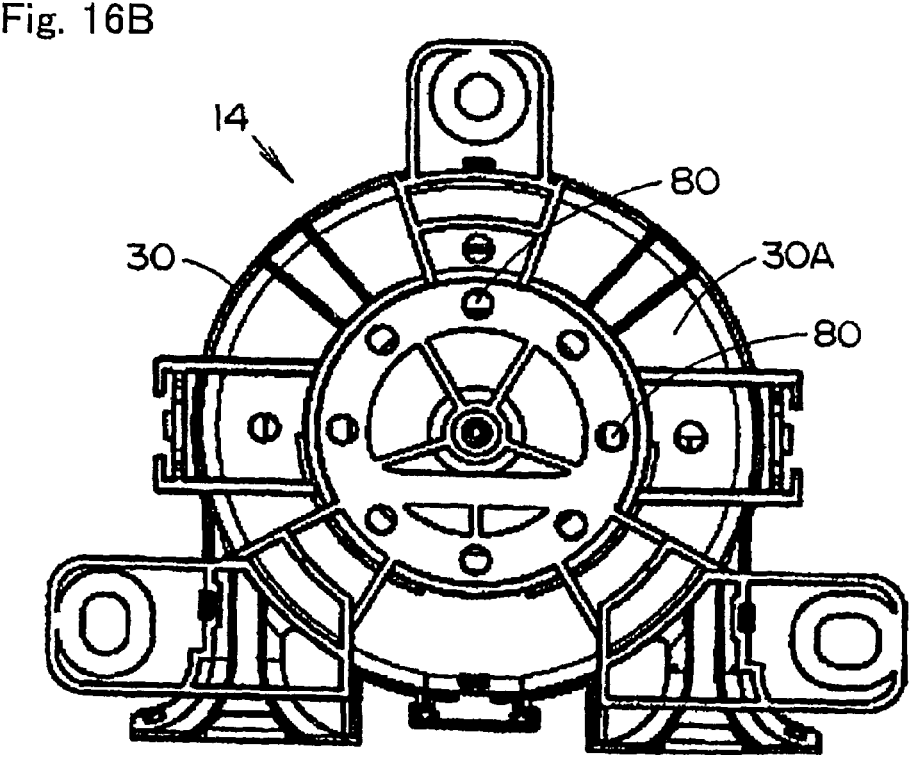
FIG. 16B shows a bottom face of the discharge structure.

FIGS. 14 to 16 show solutions for foreign material likely entering into the extra-length absorbing unit 14. When the extra-length absorbing unit 14 is installed in the vicinity of the portion stamped by the foot at the time of riding on or getting off the vehicle, there is a possibility that the foreign material such as pebble enters into the gate for the flexible tube. In addition, when the sliding door is opened at the time of raining, there is a possibility that rain water or muddy water enters into the gate for the flexible tube. Furthermore, when drink is spilled inside of the vehicle, there is a possibility that drink enters into the gate for the flexible tube. In those cases, the pebble or water likely enters into the case of the extra-length absorbing unit, and the quality of the extra-length absorbing unit is deteriorated, in case that the pebble is caught or water is collected.

The solutions to prevent the above problem are as follows: the first solution is to provide a cutout portion 76 in the bottom portion of the gate 28 for the flexible tube in the case 30 so that the foreign material such as pebble is not collected. With the cutout portion thus provided, the foreign material falls through the cutout portion 76, thus lowering the possibility that the foreign material enters into the case 30 in case that the flexible tube goes into or out of the case.

The second solution is to provide a gap between the case 30 and the rotating drum 32 larger than a size of foreign material likely entering into the case 30 as shown in FIGS. 15A and 15B. With the gap thus provided, even if the foreign material enters into the case 30, there is no provability that the foreign material is clogged between the case 30 and the rotating drum 32 to prevent the rotating drum from rotating. More specifically, the gap of about 2 mm may be provided between the case 30 and the rotating drum 32. For experiment, two kinds of Pebbles having the size of 2 mm to 6 mm and pebbles having the size of less than 2 mm are poured into the gate for the flexible tube from the above, and then the flexible tube was repeatedly pulled out and wounded fifty times. As a result, it is understood that the pebbles having the size of 2 mm to 6 mm are rejected by the flexible tube and are not collected in the gate while the pebble having the size of less than 2 mm sometimes enters into the case. More specifically, it is highly possible that the pebbles having the seize of less than 2 mm enter into the case. Therefore, when the gap having the size of about 2 mm is provided between the case 30 and the rotating drum 32, the foreign material is not clogged between the case and the rotating drum 32, thus the rotating drum is smoothly rotated.

The third solution is to provide a slant surface and a through hole in the bottom portion 78 of the lower case 30A for discharging the foreign material entered into the case 30. With the slant surface and the through hole thus provided, the foreign material and water entered into the case 30 can be discharged out of the case.

The fourth solution is to provide a rib on a coiled spring receiving portion so that the coiled spring is placed with a space from the bottom surface of the lower case. With the rib thus provided, the water is more surely discharged so that a drop of water is not likely attached to the coiled spring 34, thus enabling to maintain the quality of the coiled spring 34.

Figure 17A:
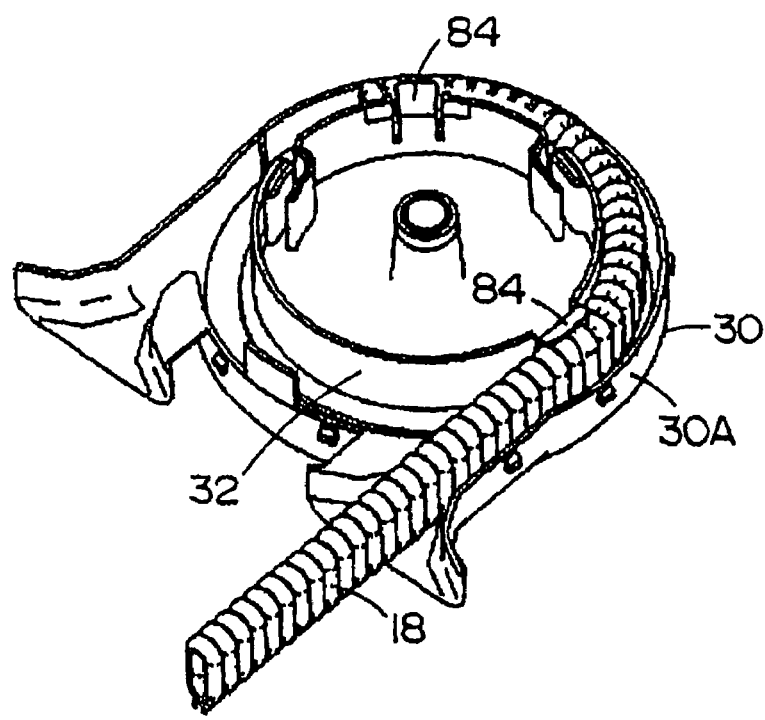
FIG. 17A is an oblique view showing a structure of preventing a noise in the extra-length absorbing unit.
Figure 17B:
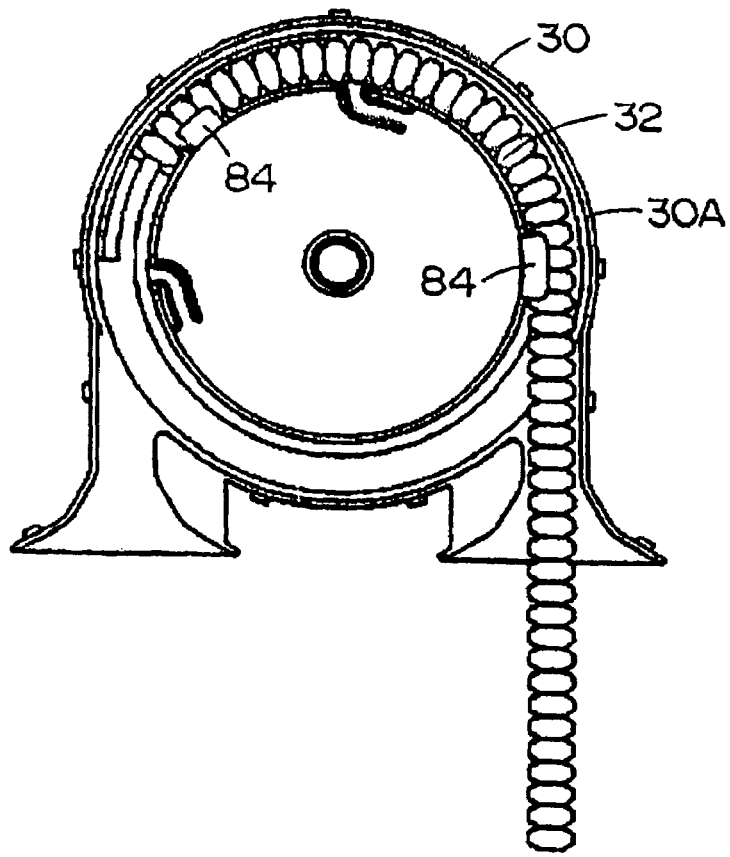
FIG. 17B is a plan view showing a structure of preventing a noise in the extra-length absorbing unit.

FIG. 17 shows a solution for a provable noise produced within the extra-length absorbing unit. The vehicle side end portion of the flexible tube 18 is fixed to the rotating drum 32 by a fixing component 46 (refer to FIG. 6), the door side end portion thereof is fixed to the door side fixing unit 16 (refer to FIG. 2), thus the flexible tube is not jolted upward and downward at both end portions. However, the intermediate portion of the flexible tube 18 is possibly shaken upward and downward by the vibration caused during the driving of the car and the flexible tube going in and out of the extra-length absorbing unit 14 with opening and closing of the sliding door. In this case, it is considered that the portion of the intermediate portion of the flexible tube which is received within the case may hit the case, in particular the upper case 30B (refer to FIG. 4) to generate a noise. The solution to the above is to provide an extended piece 84 for restricting upward and downward movements of the flexible tube wound around the rotating drum on the upper end portion of the rotating drum extending outward as shown in FIGS. 17A and 17B. With the extended piece thus provided, the flexible tube may not hit the case 30, thus preventing the noise from being generated.

Figure 18A:
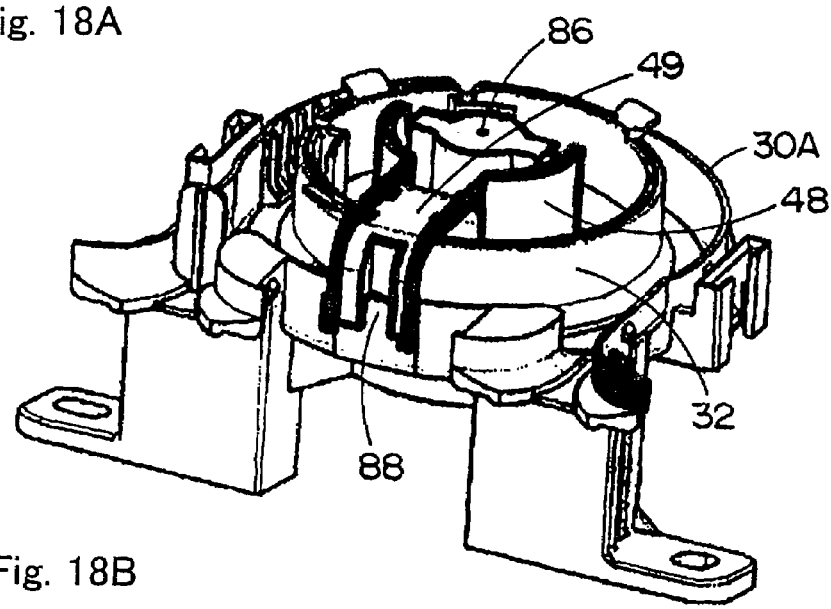
FIG. 18A is an oblique view showing a preferable embodiment of the sub-cover.
Figure 18B:
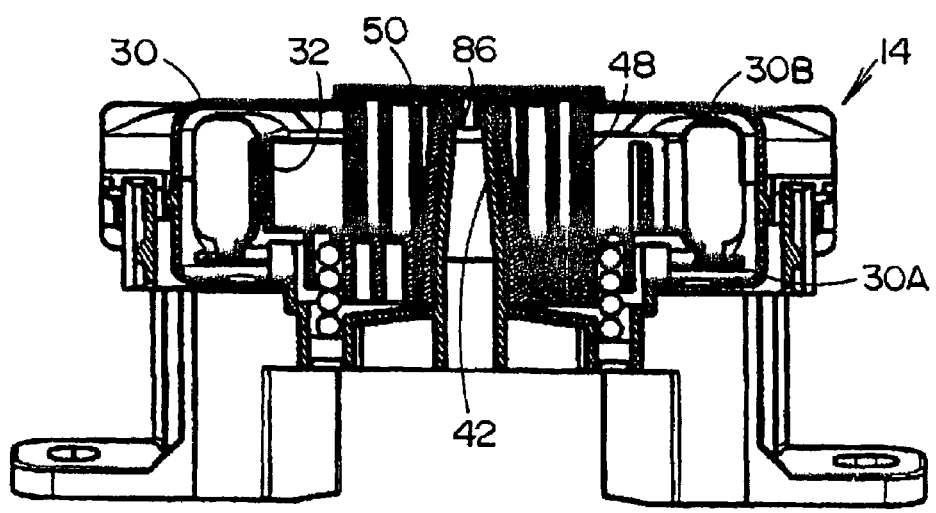
FIG. 18B is a cross sectional view thereof.

FIG. 18 shows a preferable embodiment of the sub-cover 48. The sub-cover fixes the inner peripheral portion of the flat cable 20 wound in spiral within the rotating drum to the center portion of the case 30. The sub-cover includes a fitting protruding portion 86 for fitting to an upper end hole portion of the main axis 42 of the lower case 30 and a trough-shaped guide passage 49 for guiding the flat cable over the rotating drum 32 to outside of the case. The outer end of the guide passage 49 is fixed to an outer peripheral portion of the lower case 30A by a lock portion 88.

With the sub-cover thus provided, the flat cable 20 may not contact with the flexible tube 18 or the spiral flat cable 20 in the rout from the center portion of the case 30 to the exit portion to the outside. Furthermore, the flat cable may not be caught, thus improving the quality of the extra-length absorbing unit 14.

In addition, upon assembling the extra-length absorbing unit 14, it becomes easy to pile the components in order from the bottom to upper by using the sub-cover 48, thus improving the assembling efficiency to provide a power supply device for a sliding door having a more stable quality. Since the power supply device for a sliding door may be operated at the time of finishing the assembling up to the sub-cover 48, it is possible to check the operation in the way of assembling, thus remarkably lowering the possibility of finding the malfunctioning after fitting the upper case.

A groove-shaped cover portion 50 is formed on the upper case 30B, to which an upper face portion (including the guide passage 49) of the sub-cover 48 is fitted (refer to FIG. 6). With the groove-shaped cover portion thus formed, the sub-cover 48 is not deformed during operation, thus avoiding the lower portion of the sub-cover from contacting with the rotating drum 32 to smoothly absorb the extra-length.

Figure 19:
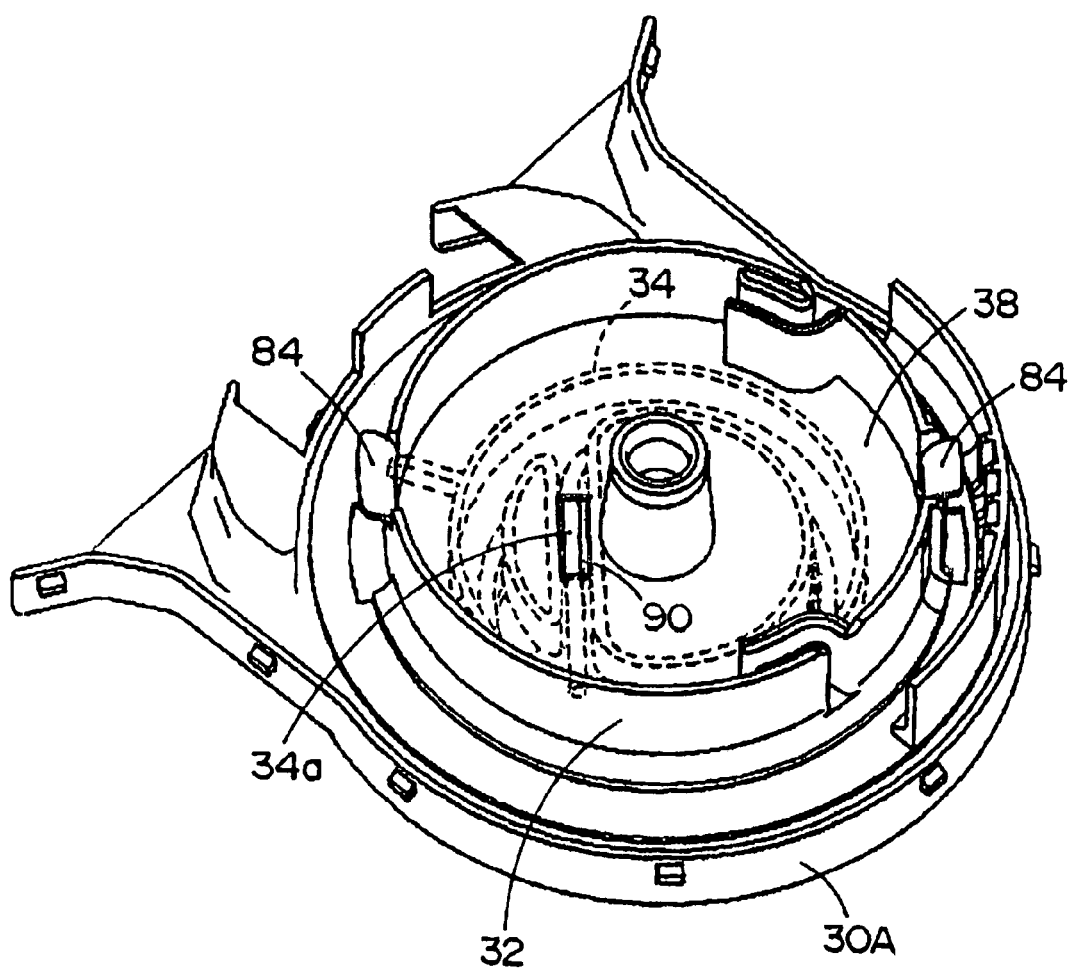
FIG. 19 is an oblique view showing a preferable embodiment of the rotating drum.

FIG. 19 shows a preferable embodiment of the rotating drum 32. The rotating drum has an opening portion 90 formed on a bottom plate portion thereof at a position corresponding to a portion to which an end portion of the coiled spring 34 is come into contact. With the opening portion 90 thus formed, at first the coiled spring 34 is installed in the prescribed position of the lower case 30A in such manner that the lower end of the coiled spring 34 is fitted in a spring-end supporting portion of the lower case 30A. Then, the upper end portion 34a of the coiled spring 34 is fitted in the spring-end supporting portion of the rotating drum 32 while viewing the upper end portion 34a of the coiled spring 34 from the opening portion 90 when the rotating drum 32 is assembled. Thus, the rotating drum 32 may be simply and effectively assembled.

FIG. 20 shows a preferable embodiment of the assembled rotating drum 32, lower case 30A and coiled spring 34. An upper end of the coiled spring 34 is positioned above a lower end 92a of the coiled spring receiving portion 92, and a distance (Q) from the upper end of the coiled spring 34 to the upper end face 92b of the coiled spring receiving portion of the rotating drum 32 is formed so as to be larger than a distance (R) from the upper end of the coiled spring 34 to the lower end 92a of the coiled spring receiving portion of the rotating drum 32, when the upper face of the stopper 74 (refer to FIG. 11) provided in the lower case 30A for restricting the rotation angle is contacted with the lower face of the stopper 72 (refer to FIG. 11) provided in the rotating drum 32 for restricting the rotation angle in assembling of the rotating drum 32, the lower case 30A and the coiled spring 34.

With the rotating drum, lower case and coiled spring thus assembled, the coiled spring 34 can be easily and surely engaged by simply assembling the rotating drum 32 in the prescribed position, after the coiled spring 34 is assembled in the prescribed position of the lower case 30A.

Figure 20A:
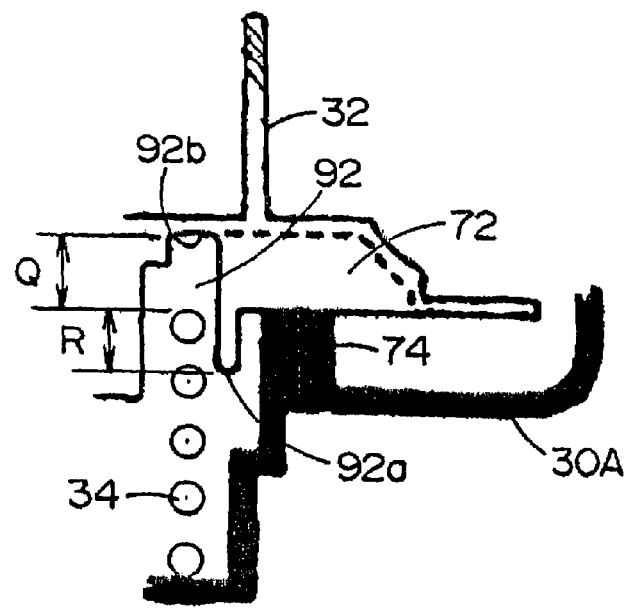
FIG. 20A is a cross sectional view showing a preferable embodiment of the rotating drum, lower case and coiled spring in the way of the assembling.
Figure 20B:
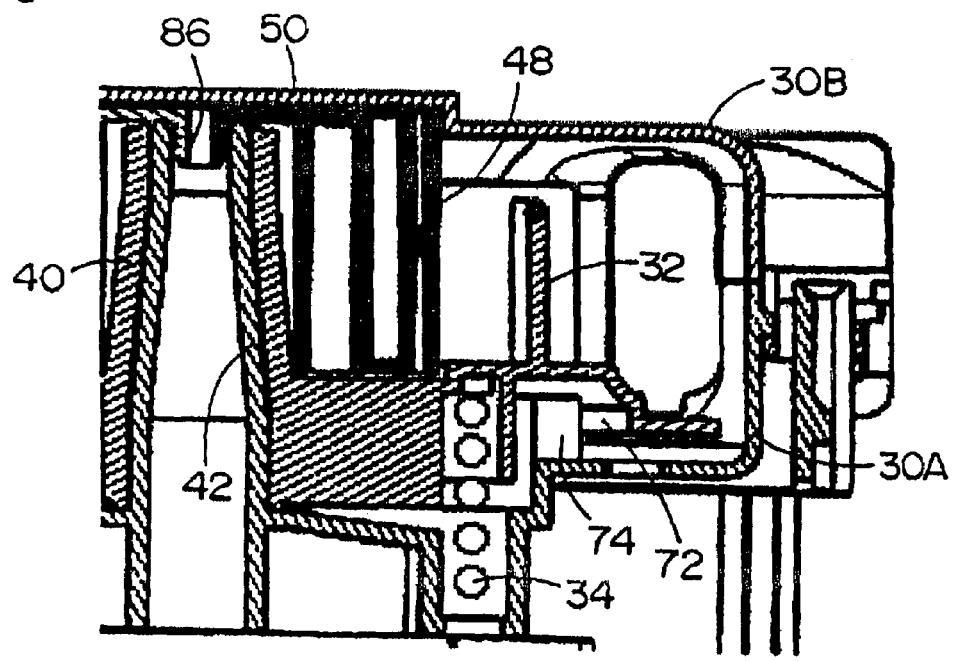
FIG. 20B is a cross sectional view showing a preferable embodiment of the rotating drum, lower case and coiled spring after assembled.

The rotating drum 32, the lower case 30A and the coiled spring 34 are assembled in such manner that a coiled spring 34 which is not turned and a lower case 30A are arranged so as not to be relatively rotated (the lower end of the coiled spring 34 is fitted in the spring support portion of the lower case 30A), and a coiled spring 34 which is not turned and a rotating drum 32 are arranged so as not to be relatively rotated (the upper end of the coiled spring 34 is fitted in the spring support portion of the rotating drum 32), thus, the upper face of the stopper 74 provided in the lower case 30A for restricting the rotation angle is contacted with the lower face of the stopper 72 provided in the rotating drum 32 for restricting the rotation angle, and then, the rotating drum 32 is turned in a direction to give a prescribed rotation angle to the coiled spring 34 and is pushed toward the lower case 30A as shown in FIG. 20A, thus the stopper 74 in the lower case 30A is engaged to the stopper 72 in the rotating drum 32 as shown in FIG. 20B.

With the above, the rotating drum 32 can be assembled in the prescribed position with the coiled spring not loaded, thus easily assembled by simply turning the rotating drum 32 and pushing in to the side of the lower case 30A. Damage to the components not likely occurs in assembling, thus enabling to stable the quality.

SECOND EMBODIMENT

Figure 21:
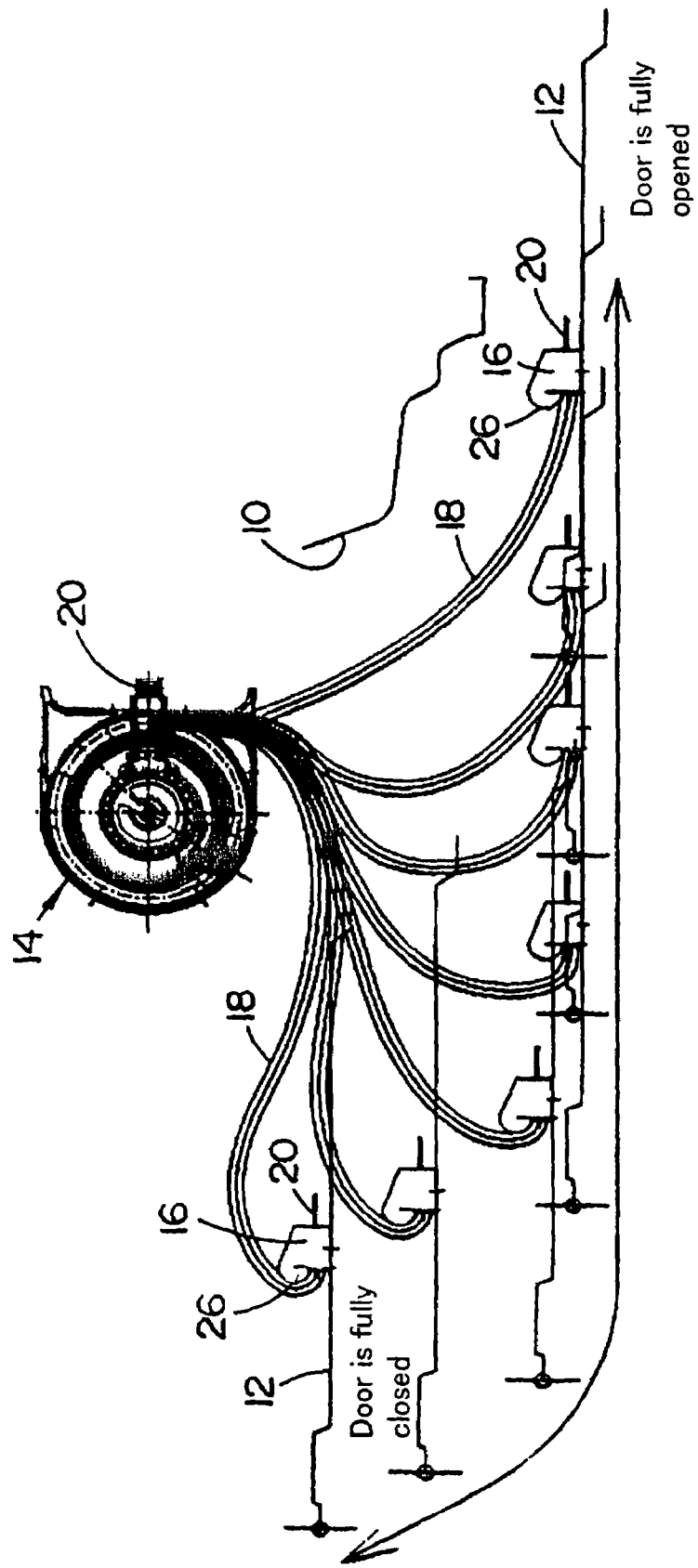
FIG. 21 is a plan view showing another embodiment of the power supply device for a sliding door of the invention together with a trace of the bent flexible tube which moves from the point in which the sliding door is fully closed to the point in which the sliding door is fully opened.
Figure 22:
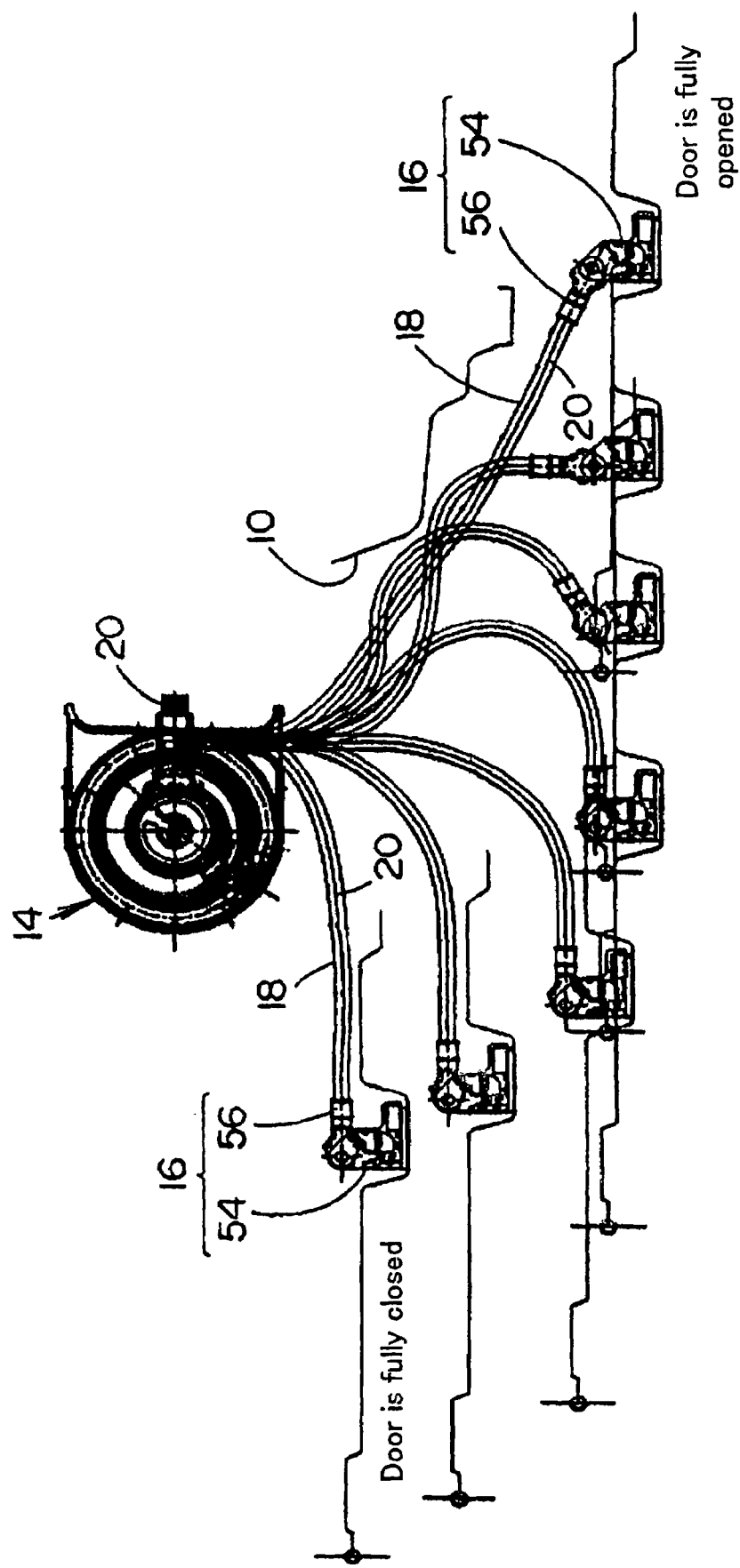
FIG. 22 is a plan view showing other embodiment of the power supply device for a sliding door of the invention together with a trace of the bent flexible tube which moves from the point in which the sliding door is fully closed to the point in which the sliding door is fully opened.
Figure 23:
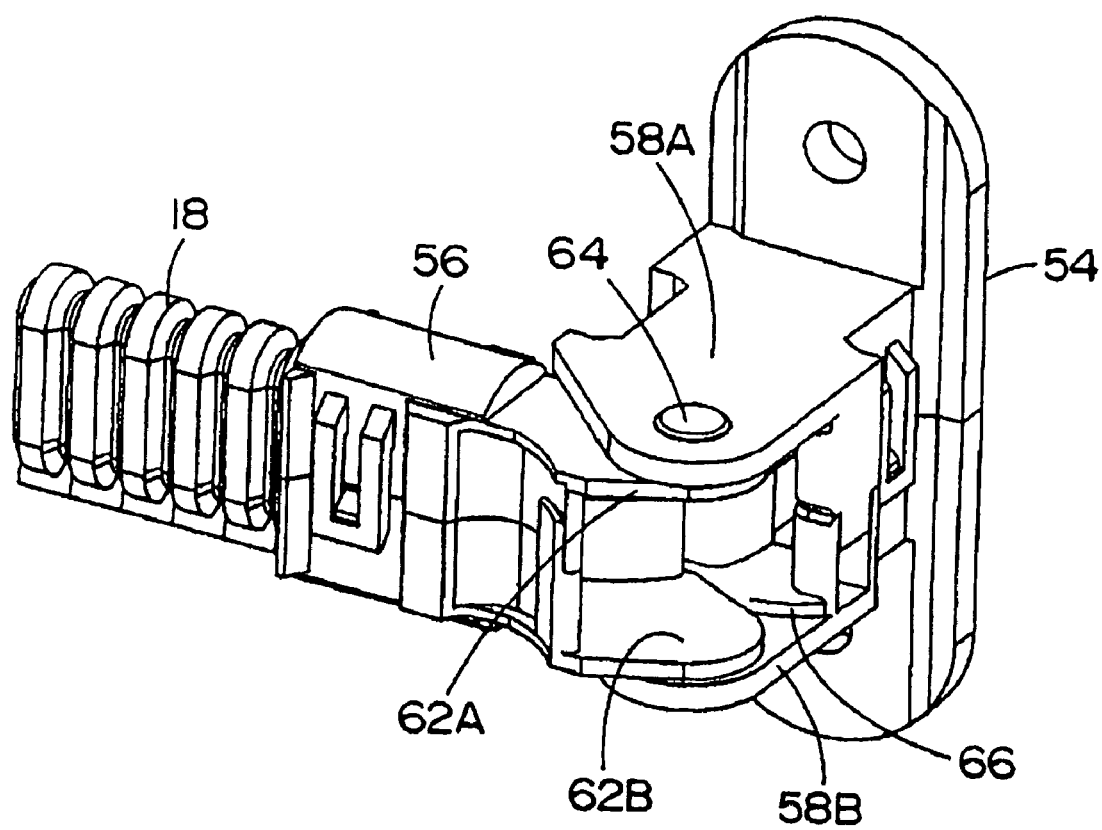
FIG. 23 is an oblique view showing a door side fixing unit applied to the power supply device for a sliding door of the invention as shown in FIG. 22.

FIG. 21 shows other embodiment of the power supply device for a sliding door of the invention. The difference between the present embodiment and the first embodiment is that the door side fixing unit 16 of this embodiment is fixed to the sliding door 12 in such manner that the flexible tube 18 goes out to the frontward of the sliding door. In this case, if the fixing position of the extra-length absorbing unit 14 to the vehicle is the same as that in the first embodiment, the route of the flexible tube 18 from the gate 28 for the flexible tube in the extra-length absorbing unit 14 to the door side fixing unit 16 in the fully closed sliding door becomes a little longer than that in the fully opened sliding door, in reverse to the first embodiment. Accordingly, the winding length (i.e., extra-length) of the flexible tube 18 by the rotating drum 32 becomes short when the sliding door 12 is fully closed and long when the sliding door 12 is fully opened.

Except the above-mentioned difference, the second embodiment is the same as the first embodiment. The detail explanation is omitted with the same reference numerals used. According to the second embodiment, the same effect can be obtained as that of the first embodiment.

THIRD EMBODIMENT

FIGS. 22 to 25 show another embodiment of the power supply device for a sliding door of the invention. The difference between the present embodiment and the first embodiment is that the door side fixing unit 16 of this embodiment comprises a fixing member 54 fixed to the sliding door 12, a tube end clamp 56 pivotably fixed in a plane perpendicular to a longitudinal axis of the fixing member 54. The tube end clamp 56 holds the end portion of the flexible tube 18.

Figure 24:
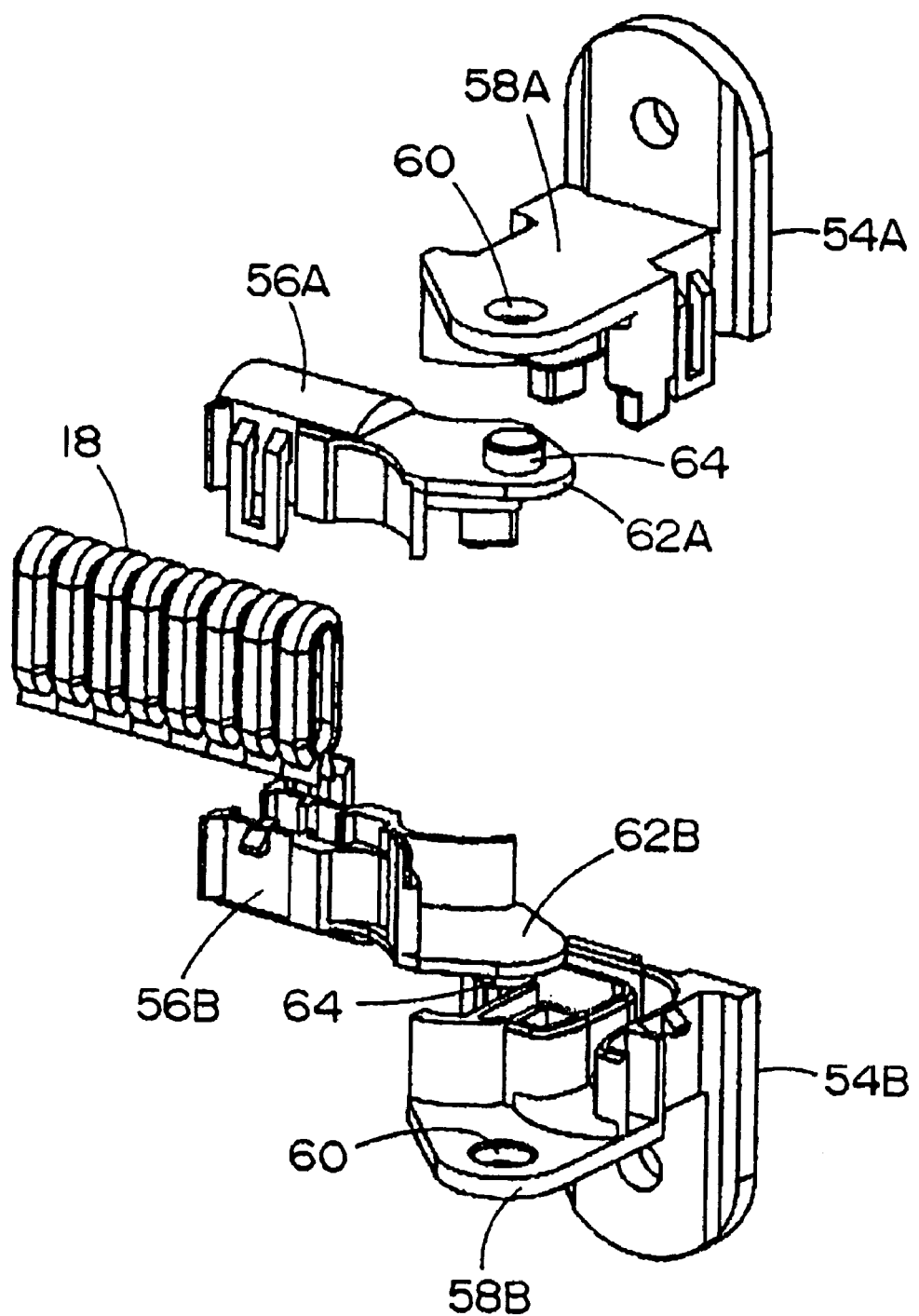
FIG. 24 is an oblique disassembled view of the door side fixing unit.
Figure 25:
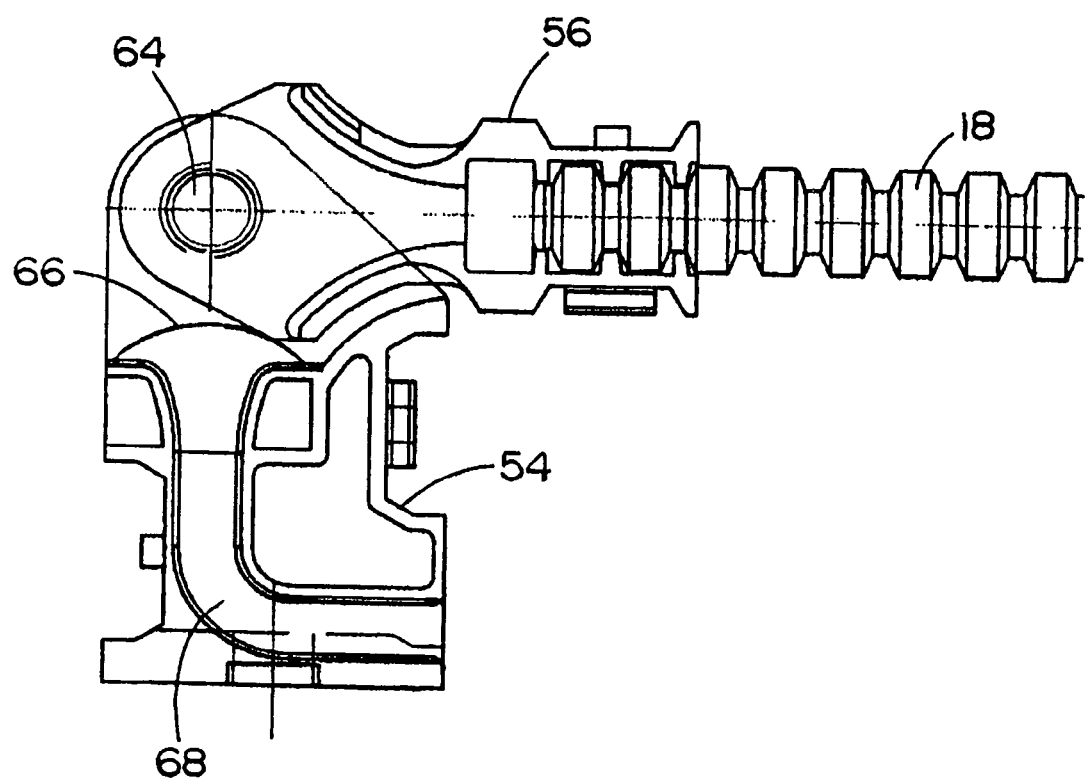
FIG. 25 is a horizontal cross sectional view of the door side fixing unit.

The fixing member 54 comprises an upper side component 54A and a lower side component 54B both of which are to be engaged, as shown in FIG. 24. The fixing member 54 includes two opposing support plates 58A, 58B, and an axis hole 60 is formed in the respective support plates. The tube end clamp 56 comprises an upper side clamp 56A and a lower side clamp 56B both of which are to be engaged. The tube end clamp 56 includes a pair of (upper side and lower side) arms 62A, 62B extending to the fixing member 54. Axis pin 64 is provided so as to protrude on the upper face of the upper side arm 62A and the lower face of the lower side arm 62B, respectively. The axis pin 64 is inserted into the axis hole 60 of the fixing member 54 so that the tube end clamp 56 can pivot in a plane perpendicular to a longitudinal axis of the fixing member 54. A restricting portion 66 for restricting the tube end clamp 56 to pivot within a prescribed range is provided with the fixing member 54. Furthermore, a guide groove 68 is formed in the fixing member 54 for guiding the flat cable 20 into the sliding door 12 (refer to FIG. 25).

When the above-mentioned door side fixing unit 16 is applied, the flexible tube 18 is not severely bent at a mouth portion of the door side fixing unit 16 at the time that the sliding door 12 is fully opened or fully closed, thus there is no tendency to be habitually bent in a specific portion of the flexible tube 18.

Except the above-mentioned difference, the third embodiment is the same as the first embodiment. The detail explanation is omitted with the same reference numerals used. According to the third embodiment, the same effect can be obtained as that of the first embodiment.

The power supply device for a sliding door of the invention has a flexible tube ranging from the vehicle side to the sliding door side which is wound together with the wire harness into the extra-length absorbing unit, and since the tensile force is constantly charged on the flexible tube by the winding force, it is possible that a trace of the bent flexible tube 18 by the opening and closing of the sliding door is maintained to be constant. Therefore, the flexible tube does not likely contact with other members even if having a narrow space to prevent a noise or damage from occurring.

The extra-length absorbing unit is a type winding the flexible tube. Since the extra-length absorbing unit is fixed to the vehicle body so as to be located in an intermediate position of a moving range of the door side fixing unit by an opening and closing movements of the sliding door, only the difference between the maximum extra-length and the minimum extra-length may have to be wound, thus the length of winding the flexible tube may be small so that it is possible to prevent the extra-length absorbing unit from being a bigger size. In particular, when the wire harness is constructed by one sheet or plurality sheets of flat cable, and in addition, the flexible tube is formed by the corrugated tube having a cross section of a longer vertical portion than a horizontal portion, the outer winding radius of the flexible tube can be made small, it is possible to fully downsize the extra-length absorbing unit. Furthermore, when the rib is formed on at least one of the upper and lower faces of the corrugated tube along the longitudinal direction, the extension of the flexible tube may be lowered to maintain the flexibility of the corrugated tube.

When the guide for restricting the bend radius of the flexible tube at the gate for the flexible tube in the extra-length absorbing unit, the bent shape of the flexible tube comes to stable at the time when the sliding door is fully opened or fully closed, thus it is possible to make the trace of the bent movement of the flexible tube to be highly precisely constant.

Furthermore, the door side fixing unit is fixed to the sliding door in such manner that the flexible tube goes out to a forward direction or a backward direction of the sliding door, and a guide for restricting a bend radius of the flexible tube is provided in the door side fixing unit, thus it is possible to effectively make the trace of the bent movement of the flexible tube to be highly precisely constant.

In addition, since the door side fixing unit comprises the fixing member fixed to the sliding door and the tube end clamp pivotable in the plane perpendicular to a longitudinal axis of the fixing member, the flexible tube is not severely bent at the time that the sliding door is fully opened or fully closed, thus there is no tendency to be habitually bent in the flexible tube. When the restricting portion for restricting the tube end clamp to pivot within a prescribed range is provided with the fixing member, the bent shape of the flexible tube comes to stable at the time when the sliding door is fully opened or fully closed, thus it is possible to make the trace of the bent movement of the flexible tube to be highly precisely constant.

Furthermore, since the case of the extra-length wire harness absorbing unit comprises a lower case, an upper case, and a sub-cover for fixing an inner peripheral portion of a wound wire harness in spiral to a center portion of the case, a main axis portion inserted into a hollow axis portion of the rotating drum is formed in the lower case, the sub-cover is attached to the main axis and the coiled spring is incorporated between the lower case and the rotating drum, the extra-length absorbing unit may be easily assembled. In addition, when the coiled spring is used, it is possible to prevent the spring from being bigger size compared with the case in which the spiral spring is used. Furthermore, since the main axis is provided, the strength of the case in upward and downward direction may become higher.

In addition, when the stoppers for restricting the rotation angle of the rotating drum are provided respectively on the lower face of the bottom plate of the rotating drum, and opposing upper face of the bottom plate of the lower case, for example, the relative position of the stoppers may be arranged so that the tensile force is to be charged to the flexible tube prior to the full opening of the sliding door, thus enable to selectively set the range of the tensile force to be charged for each of kinds of vehicles, in addition, a degree of looseness of the flexible tube can be lowered.

What is claimed is:

1. A power supply device for a sliding door comprising an extra-length absorbing unit, a door side fixing unit fixed to a sliding door, a flexible tube extending from said extra-length absorbing unit to said door side fixing unit, and a wire harness wired from a vehicle body through said extra-length absorbing unit, said flexible tube and said door side fixing unit to the sliding door, wherein said extra-length absorbing unit includes a case having a gate for said flexible tube, a rotating drum for winding said flexible tube in the case, and a torsion spring for providing a turning force with said rotating drum in a winding direction of said flexible tube, an end portion at the vehicle body of said flexible tube being fixed on the rotating drum, a portion at the vehicle side of said wire harness being fixed to the rotating drum in a vicinity of the end portion of said flexible tube, said flexible tube being wound in spiral within the rotating drum, a spiral inner peripheral portion thereof being fixed to a center portion of the case, and said flexible tube being pulled out of the case through the gate, said door side fixing unit holds an end portion of said flexible tube at a side of a sliding door, a sliding door side portion of said wire harness being pulled out of the end portion of the flexible tube into the sliding door, and said extra-length absorbing unit is fixed to the vehicle body so as to be located in an intermediate position of a moving range of the door side fixing unit by an opening and closing movements of the sliding door, said flexible tube being provided with a tensile force by the turning force of the rotating drum from the extra-length absorbing unit to said door side fixing unit.

2. The power supply device for a sliding door as claimed in claim 1, wherein said wire harness comprises one sheet or plurality sheets of flat cable, said flexible tube comprises a corrugated tube having a cross section of a longer vertical portion than a horizontal portion in which said one sheet or plurality sheets of flat cable are received with the width thereof vertically directed.

3. The power supply device for a sliding door as claimed in claim 2, wherein said corrugated tube includes a rib running along a longitudinal direction on at least one of an upper surface and lower surface thereof.

4. The power supply device for a sliding door as claimed in claim 1, wherein a guide for restricting a bend radius of said flexible tube within a prescribed range is provided on the gate for the flexible tube in said extra-length absorbing unit.

5. The power supply device for a sliding door as claimed in claim 4, wherein a reinforcing wall portion for preventing the guide from flexing is provided at a back side of said guide for restricting a bend radius of said flexible tube within a prescribed range.

6. The power supply device for a sliding door as claimed in claim 1, wherein said door side fixing unit is fixed to the sliding door in such manner that said flexible tube goes out to a forward direction or a backward direction of the sliding door, and a guide for restricting a bend radius of said flexible tube within a prescribed range is provided in a vicinity of an exit port of said flexible tube in said extra-length absorbing unit.

7. The power supply device for a sliding door as claimed in claim 1, wherein said door side fixing unit comprises a fixing member for being fixed to the sliding door, a tube end clamp for being pivotably fixed in a plane perpendicular to a longitudinal axis of the fixing member, and a restricting portion for restricting the tube end clamp to pivot within a prescribed range is provided with said fixing member.

8. The power supply device for a sliding door as claimed in any one of claims 1 to 7, wherein the case of said extra-length wire harness absorbing unit comprises a lower case, an upper case, and a sub-cover for fixing an inner peripheral portion of a wound wire harness in spiral to a center portion of the case, a main axis portion inserted into a hollow axis portion of the rotating drum is formed in the lower case, a central cylindrical portion is formed in the upper case so as to be positioned at an outer peripheral of the hollow axis portion of the rotating drum, the sub-cover is attached to the central cylindrical portion so as not to rotate, the torsion spring comprises a coiled spring, and the coiled spring is incorporated between the lower case and the rotating drum in such condition that the coiled spring is turned so that the turning force is given to the rotating drum in a direction of winding the flexible tube.

9. The power supply device for a sliding door as claimed in any one of claims 1 to 7, wherein the case of said extra-length wire harness absorbing unit comprises a lower case, an upper case, and a sub-cover for fixing an inner peripheral portion of a wound wire harness in spiral to a center portion of the case, a main axis portion inserted into a hollow axis portion of the rotating drum is formed in the lower case, the sub-cover is attached to the main axis portion so as not to rotate, the torsion spring of the extra-length absorbing unit comprises a coiled spring, and the coiled spring is incorporated between the lower case and the rotating drum in such condition that the coiled spring is turned so that the turning force is given to the rotating drum in a direction of winding the flexible tube.

10. The power supply device for a sliding door as claimed in claim 8, wherein a stopper for restricting a rotation angle of the rotating drum is provided respectively on a lower surface of a bottom portion of the rotating drum, and a corresponding upper surface of a bottom portion of the lower case.

11. The power supply device for a sliding door as claimed in claim 8, wherein a cutout portion for preventing foreign material from being collected is provided on a bottom portion in the case for the gate of the flexible tube, a gap larger than a size of foreign material likely entering into the case is provided between the case and the rotating drum, a slant surface and a through hole are formed on the bottom portion of the lower case so as to discharge the foreign material entered into the case, and a rib is provided on a coiled spring receiving portion so that the coiled spring is placed with a space from the bottom surface of the lower case.

12. The power supply device for a sliding door as claimed in claim 8, wherein an extended piece for restricting upward and downward movement of the flexible tube wound around the rotating drum is provided on an upper end portion of the rotating drum extending outward thereof.

13. The power supply device for a sliding door as claimed in claim 8, wherein an opening portion is formed on a bottom plate portion of the rotating drum at a position corresponding to a portion to which an end portion of the coiled spring is come into contact.

14. The power supply device for a sliding door as claimed in claim 10, wherein an upper end of the coiled spring is positioned above a lower end of a coiled spring receiving portion, and a distance (Q) from the upper end of the coiled spring to the upper end face of the coiled spring receiving portion of the rotating drum is formed so as to be larger than a distance (R) from the upper end of the coiled spring to the lower end of the coiled spring receiving portion of the rotating drum, when the upper face of the stopper provided in the lower case for restricting the rotation angle is contacted with the lower face of the stopper provided in the rotating drum for restricting the rotation angle in assembling of the rotating drum, the lower case and the coiled spring.

15. The power supply device for a sliding door as claimed in claim 14, wherein the rotating drum, the lower case and the coiled spring are assembled in such manner that a coiled spring which is not turned and a lower case are arranged so as not to be relatively rotated, and a coiled spring which is not turned and a rotating drum are arranged so as not to be relatively rotated, thus, the upper face of the stopper provided in the lower case for restricting the rotation angle is contacted with the lower face of the stopper provided in the rotating drum for restricting the rotation angle, and then, the rotating drum is turned in a direction to give a prescribed rotation angle to the coiled spring and is pushed toward the lower case, thus the stopper in the lower case is engaged to the stopper in the rotating drum.

16. The power supply device for a sliding door as claimed in claim 2, wherein a guide for restricting a bend radius of said flexible tube within a prescribed range is provided on the gate for the flexible tube in said extra-length absorbing unit.

17. The power supply device for a sliding door as claimed in claim 16, wherein a reinforcing wall portion for preventing the guide from flexing is provided at a back side of said guide for restricting a bend radius of said flexible tube within a prescribed range.

18. The power supply device for a sliding door as claimed in claim 2, wherein said door side fixing unit is fixed to the sliding door in such manner that said flexible tube goes out to a forward direction or a backward direction of the sliding door, and a guide for restricting a bend radius of said flexible tube within a prescribed rang is provided in a vicinity of an exit port of said flexible tube in said extra-length absorbing unit.

19. The power supply device for a sliding door as claimed in claim 2, wherein said door side fixing unit comprises a fixing member for being fixed to the sliding door, a tube end clamp for being pivotably fixed in a plane perpendicular to a longitudinal axis of the fixing member, and a restricting portion for restricting the tube end clamp to pivot within a prescribed range is provided with said fixing member.

20. The power supply device for a sliding door as claimed in claim 4, wherein said door side fixing unit is fixed to the sliding door in such manner that said flexible tube goes out to a forward direction or a backward direction of the sliding door, and the guide for restricting a bend radius of said flexible tube within a prescribed range is provided in a vicinity of an exit port of said flexible tube in said extra-length absorbing unit.

21. The power supply device for a sliding door as claimed in claim 4, wherein said door side fixing unit comprises a fixing member for being fixed to the sliding door, a tube end clamp for being pivotably fixed in a plane perpendicular to a longitudinal axis of the fixing member, and a restricting portion for restricting the tube end clamp to pivot within a prescribed range is provided with said fixing member.

22. The power supply device for a sliding door as claimed in claim 9, wherein a stopper for restricting a rotation angle of the rotating drum is provided respectively on a lower surface of the bottom portion of the rotating drum, and a corresponding upper surface of a bottom portion of the lower case.

23. The power supply device for a sliding door as claimed in claim 9, wherein a cutout portion for preventing foreign material from being collected is provided on a bottom portion in the case for the gate of the flexible tube, a gap larger than a size of foreign material likely entering into the case is provided between the case and the rotating drum, a slant surface and a through hole are formed on the bottom portion of the lower case so as to discharge the foreign material entered into the case, and a rib is provided on a coiled spring receiving portion so that the coiled spring is placed with a space from the bottom surface of the lower case.

24. The power supply device for a sliding door as claimed in claim 9, wherein an extended piece for restricting upward and downward movement of the flexible tube wound around the rotating drum is provided on an upper end portion of the rotating drum extending outward thereof.

25. The power supply device for a sliding door as claimed in claim 9, wherein the sub-cover includes a fitting portion for fitting to an upper end of the main axis portion of the lower case and a guide passage for guiding the flat cable over the rotating drum to outside of the case, outer end of the guide passage being fixed to an outer peripheral portion of the lower case.

26. The power supply device for a sliding door as claimed in claim 25, wherein a groove-shaped cover portion is formed on the upper case, to which an upper face of the sub-cover is fitted.

27. The power supply device for a sliding door as claimed in claim 9, wherein an opening portion is formed on a bottom plate portion of the rotating drum at a position corresponding to a portion to which an end portion of the coiled spring is come into contact.

28. The power supply device for a sliding door as claimed in claim 22, wherein an upper end of the coiled spring is positioned above a lower end of a coiled spring receiving portion, and a distance (Q) from the upper end of the coiled spring to the upper end face of the coiled spring receiving portion of the rotating drum is formed so as to be larger than a distance (R) from the upper end of the coiled spring to the lower end of the coiled spring receiving portion of the rotating drum, when the upper face of the stopper provided in the lower case for restricting the rotation angle is contacted with the lower face of the suopper provided in the rotating drum for restricting the rotation angle in the assembling of the rotating drum, the lower case and the coiled spring.

* * * * *